US012522905B2

(12) United States Patent
Noguchi et al.

(10) Patent No.: US 12,522,905 B2
(45) Date of Patent: Jan. 13, 2026

(54) DUPLEX STAINLESS STEEL SEAMLESS PIPE

(71) Applicant: NIPPON STEEL CORPORATION, Tokyo (JP)

(72) Inventors: Mikiko Noguchi, Tokyo (JP); Jun Nakamura, Tokyo (JP); Masayuki Sagara, Tokyo (JP); Daisuke Matsuo, Tokyo (JP); Yoshihei Wakino, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 589 days.

(21) Appl. No.: 17/995,636

(22) PCT Filed: Apr. 28, 2021

(86) PCT No.: PCT/JP2021/016954
§ 371 (c)(1),
(2) Date: Oct. 6, 2022

(87) PCT Pub. No.: WO2021/225103
PCT Pub. Date: Nov. 11, 2021

(65) Prior Publication Data
US 2023/0212723 A1 Jul. 6, 2023

(30) Foreign Application Priority Data

May 7, 2020 (JP) .............................. JP2020-081833
May 7, 2020 (JP) .............................. JP2020-081917
May 7, 2020 (JP) .............................. JP2020-082042

(51) Int. Cl.
| | | |
|---|---|---|
| *C22C 38/02* | (2006.01) |
| *C22C 38/00* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/52* | (2006.01) |
| *C22C 38/54* | (2006.01) |
| *C22C 38/58* | (2006.01) |
| *C22C 38/60* | (2006.01) |
| *F16L 9/02* | (2006.01) |
| *C21D 1/26* | (2006.01) |
| *C21D 6/00* | (2006.01) |
| *C21D 7/10* | (2006.01) |
| *C21D 7/13* | (2006.01) |
| *C21D 8/10* | (2006.01) |
| *C21D 9/08* | (2006.01) |

(52) U.S. Cl.
CPC ............ *C22C 38/58* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/60* (2013.01); *F16L 9/02* (2013.01); *C21D 1/26* (2013.01); *C21D 6/004* (2013.01); *C21D 7/10* (2013.01); *C21D 7/13* (2013.01); *C21D 8/105* (2013.01); *C21D 9/08* (2013.01); *C21D 2211/001* (2013.01); *C21D 2211/005* (2013.01)

(58) Field of Classification Search
CPC ...................................................... C22C 38/46
See application file for complete search history.

(56) References Cited

U.S. PATENT DOCUMENTS

| | | | |
|---|---|---|---|
| 5,298,093 A | 3/1994 | Okamoto | |
| 2022/0127707 A1* | 4/2022 | Kato | ...................... C21D 6/005 |

FOREIGN PATENT DOCUMENTS

| | | |
|---|---|---|
| CA | 3108758 A1 | 3/2020 |
| JP | 05132741 A | 5/1993 |
| JP | 09195003 A | 7/1997 |
| JP | 2009007638 A | 1/2009 |
| JP | 2014043616 A | 3/2014 |
| JP | 2016003377 A | 1/2016 |
| JP | 2016117944 A | 6/2016 |

(Continued)

OTHER PUBLICATIONS

English machine translation of JP 2016-164288 A of Sasaki (Year: 2016).*

(Continued)

*Primary Examiner* — Jophy S. Koshy

(74) *Attorney, Agent, or Firm* — Greer, Burns & Crain, Ltd.

(57) ABSTRACT

The duplex stainless steel seamless pipe according to the present disclosure has the chemical composition described in the description and a microstructure consisting of 30 to 55% of ferrite, and austenite. In a square observation field of view region with sides of 250 μm including a center portion of the wall thickness and including a T direction and a C direction, a number of intersections NT which is a number of intersections between the line segment T1 to T4 described in the description and ferrite interfaces is 65 or more. A number of intersections NC which is a number of intersections between the line segments C1 to C4 described in the description and ferrite interfaces is 50 or more.

2 Claims, 2 Drawing Sheets

(56) References Cited

FOREIGN PATENT DOCUMENTS

JP        2016164288 A    9/2016
WO       2020044988 A1   3/2020

OTHER PUBLICATIONS

Katharina S. Ragger et al.; Materials Characterization 128 (2017); pp. 1-12.
S.S.M. Tavares et al; Engineering Failure Analysis 113 (2020)104553; pp. 1-8.
Recommended Practice DNV-RP-F112; Design of Duplex Stainless Steel Subsea Equipment Exposed to Cathodic Protection; Oct. 2008; pp. 1-20.

\* cited by examiner

DUPLEX STAINLESS STEEL SEAMLESS PIPE

TECHNICAL FIELD

The present disclosure relates to a duplex stainless steel material, and more particularly to a duplex stainless steel seamless pipe.

BACKGROUND ART

Oil wells or gas wells (hereinafter, oil wells and gas wells are collectively referred to simply as "oil wells") sometimes become a corrosive environment containing a corrosive gas. Here, the corrosive gas means carbon dioxide gas ($CO_2$ gas) and/or hydrogen sulfide gas ($H_2S$ gas). Steel materials for use in oil wells are required to have excellent corrosion resistance in a corrosive environment.

So far, as a method for improving the corrosion resistance of steel materials, a method that increases the content of chromium (Cr) and forms a passivation film mainly composed of Cr oxide on the surface of the steel material is known. In addition, a duplex stainless steel seamless pipe having a duplex microstructure consisting of a ferrite phase and an austenite phase is excellent in corrosion resistance with respect to pitting and/or crevice corrosion (hereinafter, referred to as "pitting resistance") which is a problem in an aqueous solution containing chlorides. Therefore, in an environment where excellent corrosion resistance is required, a duplex stainless steel seamless pipe is used in some cases.

In recent years, furthermore, deep wells below sea level are being actively developed. Therefore, there is a need to enhance the strength of duplex stainless steel seamless pipes. In other words, there is a growing demand for a duplex stainless steel seamless pipe that achieves both high strength and excellent pitting resistance in a compatible manner.

Japanese Patent Application Publication No. 5-132741 (Patent Literature 1), Japanese Patent Application Publication No. 9-195003 (Patent Literature 2), Japanese Patent Application Publication No. 2014-043616 (Patent Literature 3), and Japanese Patent Application Publication No. 2016-003377 (Patent Literature 4) each propose a duplex stainless steel that has high strength and excellent corrosion resistance.

The duplex stainless steel disclosed in Patent Literature 1 has a chemical composition consisting of, in weight %, C: 0.03% or less, Si: 1.0% or less, Mn: 1.5% or less, P: 0.040% or less, S: 0.008% or less, sol. Al: 0.040% or less, Ni: 5.0 to 9.0%, Cr: 23.0 to 27.0%, Mo: 2.0 to 4.0%. W: more than 1.5 to 5.0%, and N: 0.24 to 0.32%, with the balance being Fe and unavoidable impurities, in which PREW (=Cr+3.3(Mo+0.5 W)+16N) is 40 or more. Patent Literature 1 discloses that this duplex stainless steel exhibits excellent corrosion resistance and high strength.

The duplex stainless steel disclosed in Patent Literature 2 consists of, in weight %, C: 0.12% or less, Si: 1% or less, Mn: 2% or less, Ni: 3 to 12%. Cr: 20 to 35%, Mo: 0.5 to 10%, W: more than 3 to 8%, Co: 0.01 to 2%, Cu: 0.1 to 5%, and N: 0.05 to 0.5%, with the balance being Fe and unavoidable impurities. Patent Literature 2 discloses that this duplex stainless steel has more excellent corrosion resistance, without lowering the strength.

The duplex stainless steel disclosed in Patent Literature 3 has a chemical composition consisting of, in mass %, C: 0.03% or less, Si: 0.3% or less, Mn: 3.0% or less, P: 0.040% or less, S: 0.008% or less. Cu: 0.2 to 2.0%. Ni: 5.0 to 6.5%. Cr: 23.0 to 27.0%, Mo: 2.5 to 3.5%, W: 1.5 to 4.0%, N: 0.24 to 0.40%, and Al: 0.03% or less, with the balance being Fe and impurities, in which an a phase susceptibility index X (=2.2Si+0.5Cu+2.0Ni+Cr+4.2Mo+0.2 W) is 52.0 or less, a strength index Y (=Cr+1.5Mo+10N+3.5 W) is 40.5 or more, and a pitting resistance equivalent PREW (=Cr+3.3(Mo+0.5 W)+16N) is 40 or more. In the micro-structure of the steel, in a cross section in a thickness direction that is parallel to a rolling direction, when a straight line is drawn to be parallel to the thickness direction from the outer layer to a depth of 1 mm, the number of boundaries between a ferrite phase and an austenite phase which intersect with the straight line is 160 or more. Patent Literature 3 discloses that the strength of this duplex stainless steel can be enhanced without loss of corrosion resistance, and by combining the use of cold working with a high reduction rate, this duplex stainless steel exhibits excellent hydrogen embrittlement resistance characteristics.

The duplex stainless steel disclosed in Patent Literature 4 has a chemical composition consisting of, in mass %, C: 0.03% or less, Si: 0.2 to 1%, Mn: 0.5 to 2.0%, P: 0.040% or less, S: 0.010% or less, Sol. Al: 0.040% or less, Ni: 4 to less than 6%, Cr: 20 to less than 25%, Mo: 2.0 to 4.0%, N: 0.1 to 0.35%, O: 0.003% or less, V: 0.05 to 1.5%, Ca: 0.0005 to 0.02%, and B: 0.0005 to 0.02%, with the balance being Fe and impurities, and a metal microstructure which is composed of a duplex microstructure of a ferrite phase and an austenite phase, in which there is no precipitation of a sigma phase, and in which a proportion of the ferrite phase in the metal microstructure is 50% or less in area ratio, and the number of oxides having a particle size of 30 μm or more existing in a field of view of 300 $mm^2$ is 15 or less. Patent Literature 4 discloses that this duplex stainless steel is excellent in strength, pitting resistance, and low-temperature toughness.

CITATION LIST

Patent Literature

Patent Literature 1: Japanese Patent Application Publication No. 5-132741

Patent Literature 2: Japanese Patent Application Publication No. 9-195003

Patent Literature 3: Japanese Patent Application Publication No. 2014-043616

Patent Literature 4: Japanese Patent Application Publication No. 2016-003377

SUMMARY OF INVENTION

Technical Problem

In this connection, a duplex stainless steel seamless pipe for which use in the ground or in the ocean is assumed is sometimes subjected to cathodic protection for the purpose of increasing corrosion resistance. The term "cathodic protection" means making the steel material passive to corrosion by lowering the potential of the steel material. In a case where a steel seamless pipe is subjected to cathodic protection, an excess of electrons is formed around the steel seamless pipe, and protons ($H^+$) present in the vicinity of the steel seamless pipe easily become hydrogen atoms (H) or hydrogen molecules ($H_2$). As a result, in some cases the generated hydrogen atoms or hydrogen molecules penetrate into the steel seamless pipe.

Further, depending on the installation circumstances, a duplex stainless steel seamless pipe that is used as a line pipe or oil country tubular goods is subjected to stress caused by self-weight or external pressure or the like. In this case, new dislocations are generated in the steel seamless pipe by the stress. As a result, the dislocation density in the steel seamless pipe is locally increased in a region where the stress is applied. On the other hand, there is a possibility that the dislocations will occlude hydrogen. As described above, hydrogen is liable to penetrate into a steel seamless pipe subjected to cathodic protection. Therefore, in a duplex stainless steel seamless pipe subjected to cathodic protection, hydrogen induced cracking that originates from dislocations generated by stress sometimes occurs. This kind of hydrogen induced cracking is referred to as "hydrogen induced stress cracking (HISC)". Thus, a duplex stainless steel seamless pipe on which it is assumed cathodic protection treatment will be performed is required to also have excellent HISC resistance in addition to high yield strength. However, in the aforementioned Patent Literatures 1 to 4, HISC resistance has not been investigated.

An objective of the present disclosure is to provide a duplex stainless steel seamless pipe that has high strength and excellent HISC resistance.

Solution to Problem

A duplex stainless steel seamless pipe according to the present disclosure consists of, in mass %,
C: 0.030% or less,
Si: 0.20 to 1.00%,
Mn: 0.10 to 7.00%,
P: 0.040% or less,
S: 0.0100% or less,
Al: 0.100% or less,
Ni: 4.00 to 9.00%,
Cr: 20.00 to 28.00%,
Mo: 0.50 to 5.00%,
Cu: 0.01 to 4.00%,
N: 0.050 to 0.500%,
V: 0.01 to 1.50%,
W: 0 to 4.000%,
Co: 0 to 2.00%,
Sb: 0 to 0.100%,
Sn: 0 to 0.100%,
Nb: 0 to 0.100%,
Ta: 0 to 0.100%.
Ti: 0 to 0.100%,
Zr: 0 to 0.100%,
Hf: 0 to 0.100%,
B: 0 to 0.0200%, and
rare earth metal: 0 to 0.200%, and
one or more elements selected from the group consisting of
Ca: 0.0001 to 0.0200%, and
Mg: 0.0001 to 0.0200%,
with the balance being Fe and impurities,
wherein
a microstructure consists of 30 to 55% of ferrite in volume ratio and austenite;
a yield strength is 415 MPa or more; and
when a pipe axis direction of the duplex stainless steel seamless pipe is defined as an L direction, a pipe radius direction of the duplex stainless steel seamless pipe is defined as a T direction, and a perpendicular direction to the L direction and the T direction is defined as a C direction, in a square observation field of view region which includes a center portion of a wall thickness of the duplex stainless steel seamless pipe, and whose side extending in the T direction is 250 μm long and whose side extending in the C direction is 250 μm long, when four line segments extending in the T direction which are arranged at equal intervals in the C direction of the observation field of view region and which divide the observation field of view region into five equal parts in the C direction are defined as T1 to T4, four line segments extending in the C direction which are arranged at equal intervals in the T direction of the observation field of view region and which divide the observation field of view region into five equal parts in the T direction are defined as C1 to C4, and an interface between the ferrite and the austenite in the observation field of view region is defined as a ferrite interface, a number of intersections NT which is a number of intersections between the line segments T1 to T4 and the ferrite interfaces is 65 or more, and a number of intersections NC which is a number of intersections between the line segments C1 to C4 and the ferrite interfaces is 50 or more.

Advantageous Effect of Invention

The duplex stainless steel seamless pipe according to the present disclosure has high strength and excellent HISC resistance.

DESCRIPTION OF EMBODIMENTS

Figure 1:
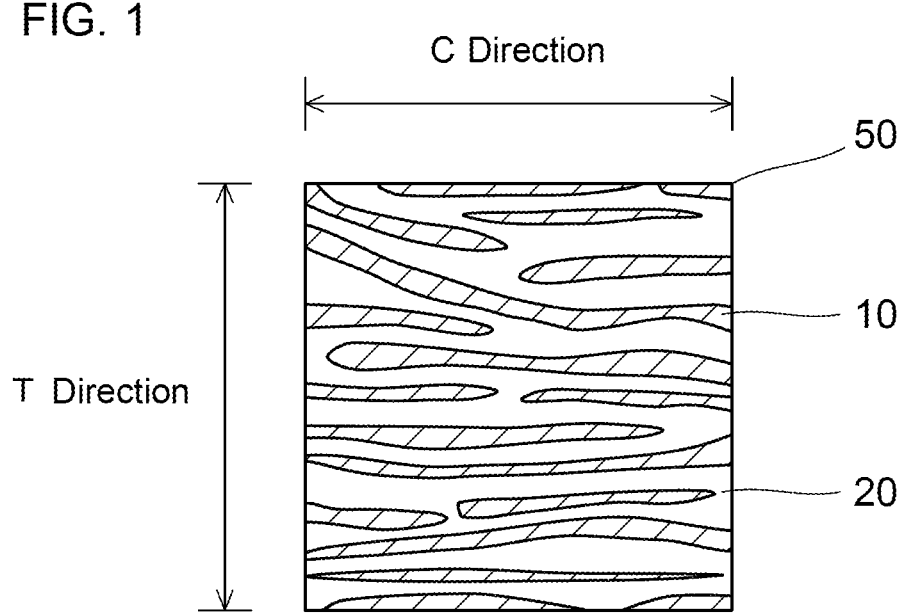
FIG. 1 is a schematic diagram of a microstructure in a cross section which is located at a center portion of the wall thickness of a duplex stainless steel seamless pipe and which is perpendicular to a pipe axis direction of the duplex stainless steel seamless pipe, the duplex stainless steel seamless pipe having the same chemical composition as that of the duplex stainless steel seamless pipe according to the present embodiment, but having a different microstructure.

First, the present inventors considered that when a duplex stainless steel seamless pipe has a chemical composition consisting of, in mass %, C: 0.030% or less, Si: 0.20 to 1.00%, Mn: 0.10 to 7.00%, P: 0.040% or less, S: 0.0100% or less, Al: 0.100% or less, Ni: 4.00 to 9.00%, Cr: 20.00 to 28.00%, Mo: 0.50 to 5.00%, Cu: 0.01 to 4.00%, N: 0.050 to 0.500%, V: 0.01 to 1.50%, W: 0 to 4.000%, Co: 0 to 2.00%, Sb: 0 to 0.100%, Sn: 0 to 0.100%, Nb: 0 to 0.100%, Ta: 0 to 0.100%, Ti: 0 to 0.100%, Zr: 0 to 0.100%, Hf: 0 to 0.100%, B: 0 to 0.0200%, and rare earth metal: 0 to 0.200%, and one or more elements selected from the group consisting of Ca: 0.0001 to 0.0200% and Mg: 0.0001 to 0.0200%, with the balance being Fe and impurities, there is a possibility that both a high yield strength of 415 MPa or more and excellent HISC resistance can be achieved in a compatible manner.

The microstructure of a duplex stainless steel seamless pipe having the aforementioned chemical composition consists of ferrite and austenite. As used herein, "consists of ferrite and austenite" means that the amount of any phase other than ferrite and austenite is negligibly small. Here, among ferrite and austenite, the yield strength of ferrite is higher than that of austenite. Therefore, the higher the volume ratio of ferrite is, the higher the yield strength of the duplex stainless steel seamless pipe will be.

That is, the present inventors considered that in order to obtain a duplex stainless steel seamless pipe having a high strength, it would suffice to make the volume ratio of ferrite high. Therefore, the present inventors produced various duplex stainless steel seamless pipes in which the volume ratio of ferrite was made high, and evaluated the HISC resistance of the steel seamless pipes. As a result, the present inventors found that when the volume ratio of ferrite is made high, in some cases the HISC resistance of the steel seamless pipe decreases.

Therefore, the present inventors conducted detailed investigations regarding the relation between ferrite and occurring of HISC. As a result, it was newly clarified that HISC easily occurs in ferrite. Although the reason for this has not been clarified in detail, the present inventors consider that the reason is as follows. In the microstructure, the permissible amount with respect to the hydrogen concentration is less in ferrite compared to austenite. In other words, compared to austenite, with even a low hydrogen concentration, the susceptibility of ferrite to stress cracking is high. The present inventors surmise that for this reason, in a case where stress is applied to a duplex stainless steel seamless pipe, hydrogen induced stress cracking will easily occur in ferrite.

For this reason, if the volume ratio of ferrite is made high, although the yield strength of the duplex stainless steel seamless pipe increases, on the other hand, the HISC resistance of the duplex stainless steel seamless pipe decreases. Therefore, in order to compatibly achieve both a yield strength of 415 MPa or more and excellent HISC resistance in a duplex stainless steel seamless pipe, it is required to make it difficult for HISC to occur in ferrite, while maintaining the volume ratio of ferrite.

Therefore, first, the present inventors conducted studies and investigations regarding the volume ratio of ferrite that is required to obtain a yield strength of 415 MPa or more. As a result, the present inventors found that when the volume ratio of ferrite is made 30 to 55%, a yield strength of 415 MPa or more will be obtained. Next, the present inventors conducted investigations regarding a method that makes it difficult for HISC to occur in ferrite, while maintaining the volume ratio of ferrite at 30 to 55%. Specifically, the present inventors focused on the distribution state of ferrite and austenite in the microstructure of duplex stainless steel seamless pipes, and conducted studies and investigations regarding the relation between the distribution state and the HISC resistance. As a result, the present inventors clarified that in duplex stainless steel seamless pipes having the chemical composition described above, even when the volume ratio of ferrite is at the same level, the degree of the HISC resistance differs depending on the distribution state of ferrite and austenite.

Figure 2:
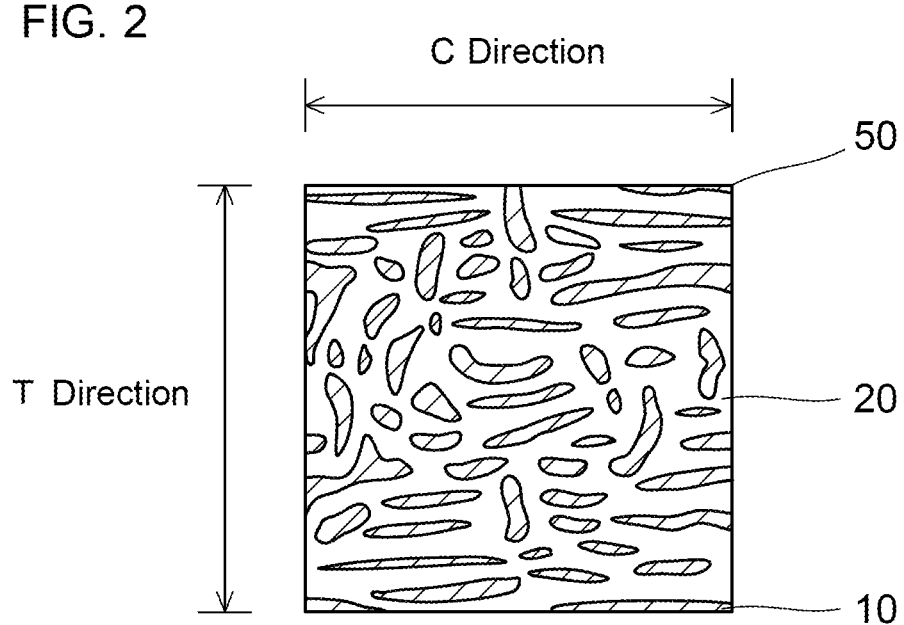
FIG. 2 is a schematic diagram of the microstructure in a cross section which is located at a center portion of the wall thickness of the duplex stainless steel seamless pipe according to the present embodiment, and which is perpendicular to the pipe axis direction of the duplex stainless steel seamless pipe.

FIG. 1 and FIG. 2 are schematic diagrams that each illustrates an example of the state of the microstructure in a cross section perpendicular to a pipe axis direction in a center portion of the wall thickness of a duplex stainless steel seamless pipe having the chemical composition described above. As used herein, the pipe axis direction of a duplex stainless steel seamless pipe is defined as an "L direction", a pipe radius direction is defined as a "T direction", and a direction perpendicular to the L direction and the T direction is defined as a "C direction". The horizontal direction in an observation field of view region 50 in FIG. 1 and FIG. 2 corresponds to the C direction. The vertical direction in the observation field of view region 50 in FIG. 1 and FIG. 2 corresponds to the T direction. In each of FIG. 1 and FIG. 2, the observation field of view region 50 is 250 µm long in the C direction and 250 µm long in the T direction.

In FIG. 1 and FIG. 2, a hatched region 10 is ferrite. A white region 20 is austenite. The volume ratio of ferrite 10 and the volume ratio of austenite 20 in the observation field of view region 50 of FIG. 1 are not so different from the volume ratio of the ferrite 10 and the volume ratio of the austenite 20 in the observation field of view region 50 of FIG. 2. However, the distribution state of the ferrite 10 and the austenite 20 in the observation field of view region 50 of FIG. 1 is significantly different from the distribution state of the ferrite 10 and the austenite 20 in the observation field of view region 50 of FIG. 2.

Specifically, in the microstructure illustrated in FIG. 1, the ferrite 10 and the austenite 20 each extend in the C direction, and the ferrite 10 and the austenite 20 are laminated in the T direction. On the other hand, in the microstructure illustrated in FIG. 2, the ferrite 10 and the austenite 20 each extend in random directions, and there is also a larger number of pieces of the ferrite 10. In addition, as the result of detailed studies conducted by the present inventors it has been clarified that a duplex stainless steel seamless pipe having the microstructure illustrated in FIG. 2 exhibits more excellent HISC resistance than a duplex stainless steel seamless pipe having the microstructure illustrated in FIG. 1.

Thus, with respect to the microstructure of steel seamless pipes, there is a possibility that if the distribution state of ferrite and austenite is different, the HISC resistance will also be different. Therefore, the present inventors conducted various studies with respect to an index of the distribution state of ferrite and austenite in the microstructure of a steel seamless pipe. Specifically, the present inventors focused on the number of interfaces between ferrite and austenite, and investigated how to make the number of interfaces an index of the distribution state of ferrite and austenite in the microstructure of a steel seamless pipe. This will now be described in detail using the drawings.

Figure 3:
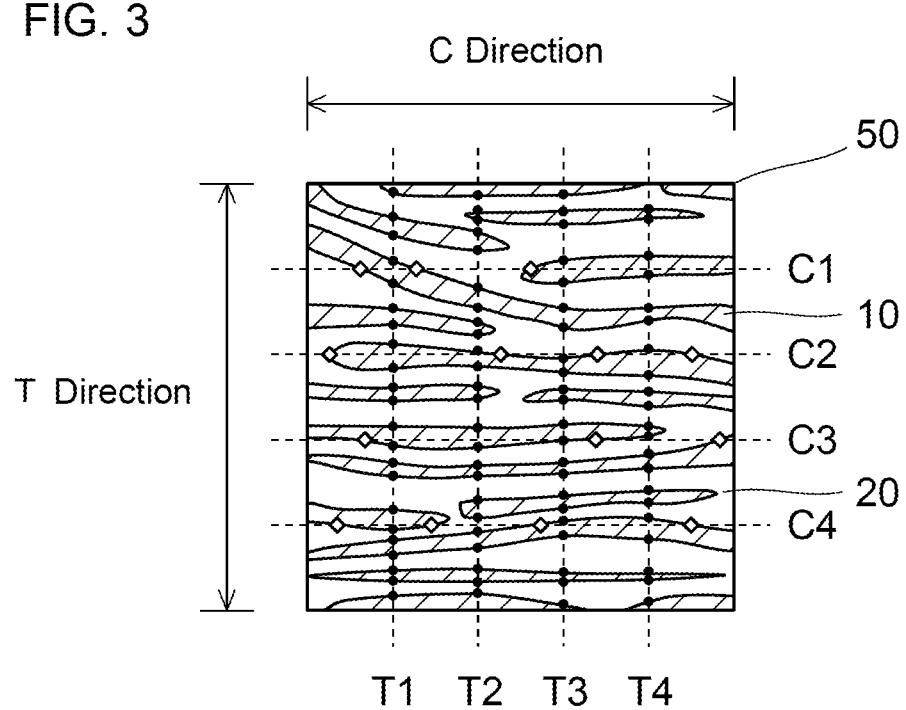
FIG. 3 is a schematic diagram for describing an index of a distribution state of a microstructure in the present embodiment using FIG. 1.
Figure 4:
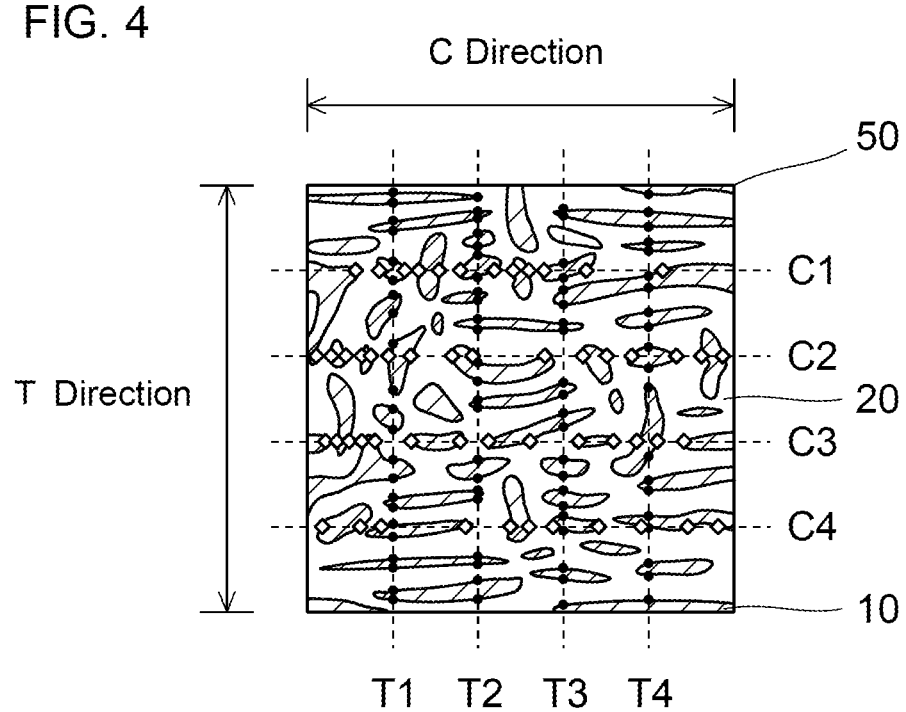
FIG. 4 is a schematic diagram for describing an index of a distribution state of a microstructure in the present embodiment using FIG. 2.

FIG. 3 and FIG. 4 are schematic diagrams for describing an index of the distribution state of a microstructure in the present embodiment using FIG. 1 and FIG. 2. Referring to FIG. 3 and FIG. 4, the ferrite 10 and the austenite 20 are included in the observation field of view region 50. Here, an interface between the ferrite 10 and the austenite 20 is defined as a "ferrite interface". Note that, since the contrast of the ferrite 10 and the contrast of the austenite 20 are different in microscopic observation, the ferrite 10 and the austenite 20 can be easily identified by those skilled in the art.

Line segments T1 to T4 in FIG. 3 and FIG. 4 are line segments extending in the T direction which are arranged at equal intervals in the C direction of the observation field of view region 50 and which divide the observation field of view region 50 into five equal parts in the C direction. The number of intersections (marked with "●" in FIG. 3 and FIG. 4) between the line segments T1 to T4 and the ferrite interfaces in the observation field of view region 50 is defined as a number of intersections NT. Line segments C1 to C4 in FIG. 3 and FIG. 4 are line segments extending in the C direction, which are arranged at equal intervals in the T direction of the observation field of view region 50, and which divide the observation field of view region 50 into five equal parts in the T direction. The number of intersections (marked with "◇" in FIG. 3 and FIG. 4) between the line segments C1 to C4 and the ferrite interfaces in the observation field of view region 50 is defined as a number of intersections NC.

Specifically, referring to FIG. 3, in the microstructure illustrated in FIG. 1, in the observation field of view region 50 having a size of 250 μm×250 μm, the number of intersections NT in the T direction is 89, and the number of intersections NC in the C direction is 14. Further, referring to FIG. 4, in the microstructure illustrated in FIG. 2, in the observation field of view region 50 having a size of 250 μm×250 μm, the number of intersections NT in the T direction is 86, and the number of intersections NC in the C direction is 53. Thus, comparing FIG. 3 and FIG. 4, it can be seen that although the number of intersections NT in the T direction is of the same level, the number of intersections NC in the C direction differs significantly. It is considered that the distribution state of ferrite and austenite in the microstructure of a steel seamless pipe can be determined in this way according to the number of intersections NT in the T direction and the number of intersections NC in the C direction.

Next, by a method to be described later, the present inventors evaluated the HISC resistance with respect to duplex stainless steel seamless pipes having the chemical composition described above in which the volume ratio of ferrite was 30 to 55%. As a result, it was clarified that in a duplex stainless steel seamless pipe having the chemical composition described above in which the volume ratio of ferrite was 30 to 55%, in an observation field of view region having a size of 250 μm×250 μm, when the number of intersections NT in the T direction is 65 or more and the number of intersections NC in the C direction is 50 or more, the HISC resistance of the steel seamless pipe markedly increases.

The reason for this has not been clarified in detail. However, the present inventors consider that the reason is as follows. As described above, even when the hydrogen concentration in ferrite is low, there is a possibility that hydrogen induced stress cracking will easily occur. In addition, it is considered that the larger that ferrite grains are, the more that hydrogen atoms accumulate in the ferrite and the easier it becomes for hydrogen molecules to form. In this case, the hydrogen concentration in ferrite increases, and it becomes easy for hydrogen induced stress cracking to occur. In other words, the HISC resistance of the steel seamless pipe decreases. On the other hand, in a case where the number of intersections NT in the T direction and the number of intersections NC in the C direction are large, there is a high possibility of ferrite grains being small overall in the microstructure of the steel seamless pipe. It is considered that as a result, accumulation of hydrogen in the ferrite is reduced, and the HISC resistance of the steel seamless pipe increases. Note that, there is also a possibility that the HISC resistance of the steel seamless pipe is increased by a mechanism other than the mechanism described above. However, the fact that both a yield strength of 415 MPa or more and excellent HISC resistance can be compatibly achieved in a duplex stainless steel seamless pipe that has the chemical composition described above in which the volume ratio of ferrite is 30 to 55%, and in which, in an observation field of view region of 250 μm×250 μm, the number of intersections NT in the T direction is 65 or more and the number of intersections NC in the C direction is 50 or more is proven by Examples that are described later.

The gist of the duplex stainless steel seamless pipe according to the present embodiment which has been completed based on the above findings is as follows.

A duplex stainless steel seamless pipe, consisting of, in mass %,
C: 0.030% or less,
Si: 0.20 to 1.00%,
Mn: 0.10 to 7.00%,
P: 0.040% or less,
S: 0.0100% or less,
Al: 0.100% or less,
Ni: 4.00 to 9.00%,
Cr: 20.00 to 28.00%,
Mo: 0.50 to 5.00%,
Cu: 0.01 to 4.00%,
N: 0.050 to 0.500%,
V: 0.01 to 1.50%,
W: 0 to 4.000%,
Co: 0 to 2.00%,
Sb: 0 to 0.100%,
Sn: 0 to 0.100%.
Nb: 0 to 0.100%,
Ta: 0 to 0.100%,
Ti: 0 to 0.100%,
Zr: 0 to 0.100%,
Hf: 0 to 0.100%,
B: 0 to 0.0200%, and
rare earth metal: 0 to 0.200%, and
one or more elements selected from the group consisting of:
Ca: 0.0001 to 0.0200%, and
Mg: 0.0001 to 0.0200%,
with the balance being Fe and impurities;
wherein
a microstructure consists of 30 to 55% of ferrite in volume ratio and austenite;
a yield strength is 415 MPa or more; and
when a pipe axis direction of the duplex stainless steel seamless pipe is defined as an L direction, a pipe radius direction of the duplex stainless steel seamless pipe is defined as a T direction, and a perpendicular direction to the L direction and the T direction is defined as a C direction,
in a square observation field of view region which includes a center portion of a wall thickness of the duplex stainless steel seamless pipe, and whose side extending in the T direction is 250 μm long and whose side extending in the C direction is 250 μm long,
when four line segments extending in the T direction which are arranged at equal intervals in the C direction of the observation field of view region and which divide the observation field of view region into five equal parts in the C direction are defined as T1 to T4,
four line segments extending in the C direction which are arranged at equal intervals in the T direction of the observation field of view region and which divide the observation field of view region into five equal parts in the T direction are defined as C1 to C4, and an interface between the ferrite and the austenite in the observation field of view region is defined as a ferrite interface, a number of intersections NT which is a number of intersections between the line segments T1 to T4 and the ferrite interfaces is 65 or more, and a number of intersections NC which is a number of intersections between the line segments C1 to C4 and the ferrite interfaces is 50 or more.

The duplex stainless steel seamless pipe according to [1], containing one or more elements selected from the group consisting of:

W: 0.001 to 4.000%,
Co: 0.01 to 2.00%,
Sb: 0.001 to 0.100%,
SN: 0.001 to 0.100%,
Nb: 0.001 to 0.100%,
Ta: 0.001 to 0.100%,
Ti: 0.001 to 0.100%,
Zr: 0.001 to 0.100%,
Hf: 0.001 to 0.100%,
B: 0.0005 to 0.0200%, and
rare earth metal: 0.001 to 0.200%.

Hereinafter, the duplex stainless steel seamless pipe according to the present embodiment will be described in detail. Note that "%" concerning an element means "mass percent" unless otherwise specified.

[Chemical Composition]

The duplex stainless steel seamless pipe according to the present embodiment contains the following elements.

C: 0.030% or Less

Carbon (C) is unavoidably contained. In other words, the lower limit of the C content is more than 0%. C forms Cr carbides at crystal grain boundaries and increases corrosion susceptibility at the grain boundaries. Therefore, if the C content is too high, the HISC resistance of the steel material will decrease even if the contents of other elements are within the range of the present embodiment. Therefore, the C content is 0.030% or less. An upper limit of the C content is preferably 0.028%, and more preferably 0.025%. The C content is preferably as low as possible. However, extremely reducing the C content will significantly increase the production cost. Therefore, when industrial manufacturing is taken into consideration, a lower limit of the C content is preferably 0.001%, and more preferably 0.005%.

Si: 0.20 to 1.00%

Silicon (Si) deoxidizes steel. If the Si content is too low, the aforementioned effect cannot be sufficiently obtained even if the contents of other elements are within the range of the present embodiment. On the other hand, if the Si content is too high, toughness and hot workability of the steel material will deteriorate even if the contents of other elements are within the range of the present embodiment. Therefore, the Si content is 0.20 to 1.00%. A lower limit of the Si content is preferably 0.25%, and more preferably 0.30%. An upper limit of the Si content is preferably 0.80%, and more preferably 0.60%.

Mn: 0.10 to 7.00%

Manganese (Mn) deoxidizes steel and desulfurizes steel. Furthermore, Mn enhances hot workability of the steel material. If the Mn content is too low, the aforementioned effects cannot be sufficiently obtained even if the contents of other elements are within the range of the present embodiment. On the other hand, if the Mn content is too high, Mn will segregate at grain boundaries together with impurities such as P and S. In this case, corrosion resistance of the steel material in a high-temperature environment will deteriorate even if the contents of other elements are within the range of the present embodiment. Therefore, the Mn content is 0.10 to 7.00%. A lower limit of the Mn content is preferably 0.30%, more preferably 0.50%, further preferably 0.70%, further preferably 0.90%, and further preferably 1.00%. An upper limit of the Mn content is preferably 6.50%, and more preferably 6.20%.

P: 0.040% or Less

Phosphorus (P) is an impurity. In other words, the lower limit of the P content is more than 0%. P segregates at grain boundaries and thereby causes toughness of the steel material to deteriorate. Therefore, the P content is 0.040% or less. An upper limit of the P content is preferably 0.035%, and more preferably 0.030%. The P content is preferably as low as possible. However, extremely reducing the P content will significantly increase the production cost. Therefore, when industrial manufacturing is taken into consideration, a lower limit of the P content is preferably 0.001%, and more preferably 0.003%.

S: 0.0100% or Less

Sulfur (S) is an impurity. In other words, the lower limit of the S content is more than 0%. S segregates at grain boundaries and thereby causes toughness and hot workability of the steel material to deteriorate. Therefore, the S content is 0.0100% or less. An upper limit of the S content is preferably 0.0085%, and more preferably 0.0030%. The S content is preferably as low as possible. However, extremely reducing the S content will significantly increase the production cost. Therefore, when industrial manufacturing is taken into consideration, a lower limit of the S content is preferably 0.0001%, and more preferably 0.0002%.

Al: 0.100% or Less

Aluminum (Al) is unavoidably contained. In other words, a lower limit of the Al content is more than 0%. Al deoxidizes steel. On the other hand, if the Al content is too high, coarse oxide-based inclusions will form and toughness of the steel material will deteriorate even if the contents of other elements are within the range of the present embodiment. Therefore, the Al content is 0.100% or less. A lower limit of the Al content is preferably 0.001%, more preferably 0.005%, and further preferably 0.010%. An upper limit of the Al content is preferably 0.090%, and more preferably 0.085%. Note that the Al content referred to in the present description means the content of "acid-soluble Al," that is, sol. Al.

Ni: 4.00 to 9.00%

Nickel (Ni) is an element that stabilizes austenite in the steel material. In other words, Ni is an element necessary for obtaining a stable duplex microstructure consisting of ferrite and austenite. Ni also enhances corrosion resistance of the steel material in a high-temperature environment. If the Ni content is too low, the aforementioned effects cannot be sufficiently obtained even if the contents of other elements are within the range of the present embodiment. In addition, if the Ni content is too low, the volume ratio of ferrite will become too high, and the HISC resistance of the steel material will decrease. On the other hand, if the Ni content is too high, the volume ratio of austenite will become too high and the strength of the steel material will decrease even if the contents of other elements are within the range of the present embodiment. Therefore, the Ni content is 4.00 to 9.00%. A lower limit of the Ni content is preferably 4.20%, more preferably 4.25%, further preferably 4.30%, further preferably 4.40%, and further preferably 4.50%. An upper limit of the Ni content is preferably 8.50%, more preferably 8.00%, further preferably 7.50%, further preferably 7.00%, and further preferably 6.75%.

Cr: 20.00 to 28.00%

Chromium (Cr) enhances corrosion resistance of the steel material in a high-temperature environment. Specifically, Cr forms a passivation film as an oxide on the surface of the steel material. As a result, corrosion resistance of the steel material increases. Cr is also an element that increases the volume ratio of ferrite in the steel material. By increasing the volume ratio of ferrite, corrosion resistance of the steel material is stabilized. If the Cr content is too low, the aforementioned effects cannot be sufficiently obtained even if the contents of other elements are within the range of the present embodiment. On the other hand, if the Cr content is too high, even if the contents of other elements are within the range of the present embodiment, the volume ratio of ferrite will become too high and the HISC resistance of the steel material will decrease. Therefore, the Cr content is 20.00 to 28.00%. A lower limit of the Cr content is preferably 21.00%, more preferably 22.00%, and further preferably 24.00%. An upper limit of the Cr content is preferably 27.50%, more preferably 27.00%, and further preferably 26.50%.

Mo: 0.50 to 5.00%

Molybdenum (Mo) enhances corrosion resistance of the steel material in a high-temperature environment. If the Mo content is too low, the aforementioned effect cannot be sufficiently obtained even if the contents of other elements are within the range of the present embodiment. On the other hand, if the Mo content is too high, hot workability of the steel material will deteriorate even if the contents of other elements are within the range of the present embodiment. Therefore, the Mo content is 0.50 to 5.00%. A lower limit of the Mo content is preferably 0.60%, more preferably 0.70%, and further preferably 0.80%. An upper limit of the Mo content is preferably 4.80%, more preferably 4.60%, and further preferably 4.30%. From the viewpoint of further enhancing corrosion resistance, a further preferable lower limit of the Mo content is more than 2.00%, further preferably is 2.20%, further preferably is 2.50%, and further preferably is 2.80%. From the viewpoint of reducing the production cost, a further preferable upper limit of the Mo content is 2.00% or less, further preferably is less than 2.00%, further preferably is 1.85%, and further preferably is 1.50%.

Cu: 0.01 to 4.00%

Copper (Cu) enhances corrosion resistance of the steel material in a high-temperature environment. If the Cu content is too low, the aforementioned effect cannot be sufficiently obtained even if the contents of other elements are within the range of the present embodiment. On the other hand, if the Cu content is too high, hot workability of the steel material will deteriorate even if the contents of other elements are within the range of the present embodiment. Therefore, the Cu content is 0.01 to 4.00%. A lower limit of the Cu content is preferably 0.05%, more preferably 0.10%, further preferably 0.30%, further preferably 0.50%, and further preferably 1.00%. An upper limit of the Cu content is preferably 3.90%, more preferably 3.75%, and further preferably 3.50%.

N: 0.050 to 0.500%

Nitrogen (N) is an element that stabilizes austenite in the steel material. In other words, N is an element necessary for obtaining a stable duplex microstructure consisting of ferrite and austenite. N also enhances corrosion resistance of the steel material. If the N content is too low, the aforementioned effects cannot be sufficiently obtained even if the contents of other elements are within the range of the present embodiment. On the other hand, if the N content is too high, toughness and hot workability of the steel material will deteriorate even if the contents of other elements are within the range of the present embodiment. Therefore, the N content is 0.050 to 0.500%. A lower limit of the N content is preferably 0.075%, more preferably 0.100%, and further preferably 0.150%. An upper limit of the N content is preferably 0.400%, and more preferably 0.350%.

V: 0.01 to 1.50%

Vanadium (V) forms carbo-nitrides and increases the strength of the steel material. If the V content is too low, the aforementioned effect cannot be sufficiently obtained even if the contents of other elements are within the range of the present embodiment. On the other hand, if the V content is too high, the strength of the steel material will become too high and toughness of the steel material will decrease even if the contents of other elements are within the range of the present embodiment. Therefore, the V content is 0.01 to 1.50%. A lower limit of the V content is preferably 0.02%, more preferably 0.03%, and further preferably 0.05%. An upper limit of the V content is preferably 1.20%, and more preferably 1.00%.

The chemical composition of the duplex stainless steel seamless pipe according to the present embodiment contains one or more elements selected from the group consisting of Ca and Mg. In other words, the chemical composition of the duplex stainless steel seamless pipe according to the present embodiment may contain one element among Ca and Mg or may contain both Ca and Mg. In short, the content of either one of Ca or Mg may be 0%. Each of these elements improves hot workability of the steel material.

Ca: 0.0001 to 0.0200%

Calcium (Ca) immobilizes S in the steel material as sulfide to make it harmless, and thereby improves hot workability of the steel material. On the other hand, if the Ca content is too high, even if the contents of other elements are within the range of the present embodiment, oxides in the steel material coarsen and toughness of the steel material deteriorates. Therefore, when contained, the Ca content is 0.0001 to 0.0200%. A preferable lower limit of the Ca content for more effectively obtaining the aforementioned effect is 0.0003%, more preferably 0.0005%, further preferably 0.0008%, and further preferably 0.0010%. An upper limit of the Ca content is preferably 0.0180%, and more preferably 0.0150%.

Mg: 0.0001 to 0.0200%

Magnesium (Mg) immobilizes S in the steel material as sulfide to make it harmless, and thereby improves hot workability of the steel material. On the other hand, if the Mg content is too high, even if the contents of other elements are within the range of the present embodiment, oxides in the steel material coarsen and toughness of the steel material deteriorates. Therefore, when contained, the Mg content is 0.0001 to 0.0200%. A preferable lower limit of the Mg content for more effectively obtaining the aforementioned effect is 0.0003%, more preferably 0.0005%, further preferably 0.0008%, and further preferably 0.0010%. An upper limit of the Mg content is preferably 0.0180%, and more preferably 0.0150%.

The balance of the chemical composition of the duplex stainless steel seamless pipe according to the present embodiment is Fe and impurities. Here, impurities in the chemical composition means those which are mixed from ores and scraps as the raw material or from the production environment when industrially producing the duplex stainless steel seamless pipe, and which are permitted within a range not adversely affecting the duplex stainless steel seamless pipe of the present embodiment.

[Optional Elements]
[First Group of Optional Elements]

The chemical composition of the duplex stainless steel seamless pipe described above may further contain W in lieu of a part of Fe.

W: 0 to 4.000%

Tungsten (W) is an optional element, and does not have to be contained. In other words, the W content may be 0%. When contained, W forms carbo-nitrides and increases the strength of the steel material. If even a small amount of W is contained, the aforementioned effect can be obtained to some extent. However, if the W content is too high, the strength of the steel material becomes too high and toughness of the steel material deteriorates even if the contents of other elements are within the range of the present embodiment. Therefore, the W content is 0 to 4.000%. A lower limit of the W content is preferably more than 0%, more preferably 0.001%, further preferably 0.002%, further preferably 0.003%, and further preferably 0.005%. An upper limit of the W content is preferably 3.750%, more preferably 3.500%, and further preferably 3.250%. An upper limit of the W content is preferably 3.500%, more preferably 3.000%, further preferably 2.000%, further preferably 1.000%, and further preferably 0.200%. From the viewpoint of further increasing the strength, a further preferable lower limit of the W content is more than 0.200%, further preferably is 0.250%, further preferably is 0.500%, further preferably is 0.750%, further preferably is 1.000%, and further preferably is 1.500%. From the viewpoint of reducing the production cost, a further preferable upper limit of the W content is 0.200%, further preferably is 0.190%, further preferably is 0.180%, and further preferably is 0.150%.

[Second Group of Optional Elements]

The chemical composition of the duplex stainless steel seamless pipe described above may further contain one or more elements selected from the group consisting of Co, Sb, and Sn in lieu of a part of Fe. Each of these elements is an optional element and enhances corrosion resistance of the steel material.

Co: 0 to 2.00%

Cobalt (Co) is an optional element and does not have to be contained. In other words, the Co content may be 0%. When contained, Co forms a film on the surface of the steel material, thereby increasing corrosion resistance of the steel material. Co also increases hardenability of the steel material and stabilizes the strength of the steel material. If even a small amount of Co is contained, the aforementioned effects can be obtained to some extent. However, if the Co content is too high, the production cost will increase extremely even if the contents of other elements are within the range of the present embodiment. Therefore, the Co content is 0 to 2.00%. A lower limit of the Co content is preferably more than 0%, more preferably 0.01%, and further preferably 0.05%. An upper limit of the Co content is preferably 1.80%, more preferably 1.60%, and further preferably 1.50%.

Sb: 0 to 0.100%

Antimony (Sb) is an optional element and does not have to be contained. In other words, the Sb content may be 0%. When contained, Sb increases corrosion resistance of the steel material. If even a small amount of Sb is contained, the aforementioned effect can be obtained to some extent. However, if the Sb content is too high, the production cost will increase extremely even if the contents of other elements are within the range of the present embodiment. Therefore, the Sb content is 0 to 0.100%. A lower limit of the Sb content is preferably more than 0%, more preferably 0.001%, and further preferably 0.002%. An upper limit of Sb content is preferably 0.080%, and more preferably 0.070%.

Sn: 0 to 0.100%

Tin (Sn) is an optional element and does not have to be contained. In other words, the Sn content may be 0%. When contained, Sn enhances corrosion resistance of the steel material. If even a small amount of Sn is contained, the aforementioned effect can be obtained to some extent. However, if the Sn content is too high, the production cost will increase extremely even if the contents of other elements are within the range of the present embodiment. Therefore, the Sn content is 0 to 0.100%. A lower limit of the Sn content is preferably more than 0%, more preferably 0.001%, and further preferably 0.002%. An upper limit of Sn content is preferably 0.080%, and more preferably 0.070%.

[Third Group of Optional Elements]

The chemical composition of the duplex stainless steel seamless pipe described above may further contain one or more elements selected from the group consisting of Nb, Ta, Ti, Zr, and Hf in lieu of a part of Fe. Each of these elements is an optional element and increases the strength of the steel material.

Nb: 0 to 0.100%

Niobium (Nb) is an optional element and does not have to be contained. In other words, the Nb content may be 0%. When contained, Nb forms carbo-nitrides and increases the strength of the steel material. If even a small amount of Nb is contained, the aforementioned effect can be obtained to some extent. However, if the Nb content is too high, the strength of the steel material becomes too high and toughness of the steel material deteriorates even if the contents of other elements are within the range of the present embodiment. Therefore, the Nb content is 0 to 0.100%. A lower limit of the Nb content is preferably more than 0%, more preferably 0.001%, and further preferably 0.002%. An upper limit of the Nb content is preferably 0.080%, and more preferably 0.070%.

Ta: 0 to 0.100%

Tantalum (Ta) is an optional element and does not have to be contained. In other words, the Ta content may be 0%. When contained, Ta forms carbo-nitrides and increases the strength of the steel material. If even a small amount of Ta is contained, the aforementioned effect can be obtained to some extent. However, if the Ta content is too high, the strength of the steel material becomes too high and toughness of the steel material deteriorates even if the contents of other elements are within the range of the present embodiment. Therefore, the Ta content is 0 to 0.100%. A lower limit of the Ta content is preferably more than 0%, more preferably 0.001%, and further preferably 0.002%. An upper limit of the Ta content is preferably 0.080%, and more preferably 0.070%.

Ti: 0 to 0.100%

Titanium (Ti) is an optional element and does not have to be contained. In other words, the Ti content may be 0%. When contained, Ti forms carbo-nitrides and increases the strength of the steel material. If even a small amount of Ti is contained, the aforementioned effect can be obtained to some extent. However, if the Ti content is too high, the strength of the steel material becomes too high and toughness of the steel material deteriorates even if the contents of other elements are within the range of the present embodiment. Therefore, the Ti content is 0 to 0.100%. A lower limit of the Ti content is preferably more than 0%, more preferably 0.001%, and further preferably 0.002%. An upper limit of the Ti content is preferably 0.080%, and more preferably 0.070%.

Zr: 0 to 0.100%

Zirconium (Zr) is an optional element and does not have to be contained. In other words, the Zr content may be 0%. When contained, Zr forms carbo-nitrides and increases the strength of the steel material. If even a small amount of Zr is contained, the aforementioned effect can be obtained to some extent. However, if the Zr content is too high, the strength of the steel material becomes too high and toughness of the steel material deteriorates even if the contents of other elements are within the range of the present embodiment. Therefore, the Zr content is 0 to 0.100%. A lower limit of the Zr content is preferably more than 0%, more preferably 0.001%, and further preferably 0.002%. An upper limit of the Zr content is preferably 0.080%, and more preferably 0.070%.

Hf: 0 to 0.100%

Hafnium (Hf) is an optional element and does not have to be contained. In other words, the Hf content may be 0%. When contained, Hf forms carbo-nitrides and increases the strength of the steel material. If even a small amount of Hf is contained, the aforementioned effect can be obtained to some extent. However, if the Hf content is too high, the strength of the steel material becomes too high and toughness of the steel material deteriorates even if the contents of other elements are within the range of the present embodiment. Therefore, the Hf content is 0 to 0.100%. A lower limit of the Hf content is preferably more than 0%, more preferably 0.001%, and further preferably 0.002%. An upper limit of the Hf content is preferably 0.080%, and more preferably 0.070%.

[Fourth Group of Optional Elements]

The chemical composition of the duplex stainless steel seamless pipe described above may further contain one or more elements selected from the group consisting of B and rare earth metal, in lieu of a part of Fe. Each of these elements is an optional element and enhances hot workability of the steel material.

B: 0 to 0.0200%

Boron (B) is an optional element and does not have to be contained. In other words, the B content may be 0%. When contained, B suppresses segregation of S at grain boundaries in the steel material and enhances hot workability of the steel material. If even a small amount of B is contained, the aforementioned effect can be obtained to some extent. However, if the B content is too high, boron nitride (BN) is produced, thereby deteriorating toughness of the steel material even if the contents of other elements are within the range of the present embodiment. Therefore, the B content is 0 to 0.0200%. A lower limit of the B content is preferably more than 0%, more preferably 0.0005%, further preferably 0.0010%, further preferably 0.0015%, and further preferably 0.0020%. An upper limit of the B content is preferably 0.0180%, more preferably 0.0150%, and further preferably 0.0100%.

Rare Earth Metal: 0 to 0.200%

Rare earth metal (REM) is an optional element and does not have to be contained. In other words, the REM content may be 0%. When contained, REM immobilizes S in the steel material as sulfide to make it harmless, and thus improves hot workability of the steel material. If even a small amount of REM is contained, the aforementioned effect can be obtained to some extent. However, if the REM content is too high, oxides in the steel material will coarsen and toughness of the steel material will deteriorate even if the contents of other elements are within the range of the present embodiment. Therefore, the REM content is 0 to 0.200%. A lower limit of the REM content is preferably more than 0%, more preferably 0.001%, further preferably 0.005%, and further preferably 0.010%. An upper limit of the REM content is preferably 0.180%, more preferably 0.150%, further preferably 0.120%, and further preferably 0.100%.

Note that, in the present description the term "REM" means one or more types of element selected from the group consisting of scandium (Sc) which is the element with atomic number 21, yttrium (Y) which is the element with atomic number 39, and the elements from lanthanum (La) with atomic number 57 to lutetium (Lu) with atomic number 71 that are lanthanoids. In the present description the term "REM content" refers to the total content of these elements.

[Microstructure]

The microstructure of the duplex stainless steel seamless pipe according to the present embodiment consists of ferrite and austenite. As used herein, the phrase "consists of ferrite and austenite" means that the amount of any phase other than ferrite and austenite is negligibly small. For example, in the microstructure of the duplex stainless steel seamless pipe according to the present embodiment, volume ratios of precipitates and inclusions are negligibly low as compared with the volume ratios of ferrite and austenite. In other words, the microstructure of the duplex stainless steel seamless pipe according to the present embodiment may contain minute amounts of precipitates, inclusions, etc., in addition to ferrite and austenite.

Further, in the microstructure of the duplex stainless steel seamless pipe according to the present embodiment, the volume ratio of ferrite is 30 to 55%. If the volume ratio of ferrite is too low, the yield strength of the steel seamless pipe will decrease. On the other hand, if the volume ratio of ferrite is too high, the HISC resistance of the steel seamless pipe will decrease. Therefore, in the microstructure of the duplex stainless steel seamless pipe according to the present embodiment, the volume ratio of ferrite is 30 to 55%. A lower limit of the volume ratio of ferrite is preferably 32%, and more preferably 35%. An upper limit of the volume ratio of ferrite is preferably 54%, and more preferably 52%.

In the present embodiment, the volume ratio of ferrite in the duplex stainless steel seamless pipe can be determined by the following method. A test specimen for microstructure observation is taken from the center portion of the wall thickness of the duplex stainless steel seamless pipe according to the present embodiment. The microstructure observation is carried out on a cross section which is perpendicular to the pipe axis direction (L direction) of the duplex stainless steel seamless pipe. Specifically, a test specimen having an observation surface including the pipe radius direction (T direction), and a direction (C direction) that is perpendicular to the L direction and the T direction is taken from the center portion of the wall thickness of the duplex stainless steel seamless pipe. Note that the size of the test specimen is not particularly limited, and it suffices that an observation surface of 5 mm in the C direction×5 mm in the T direction can be obtained. The test specimen is taken so that a center position of the observation surface in the T direction substantially coincides with the center portion of the wall thickness of the duplex stainless steel seamless pipe. The observation surface of the taken test specimen is mirror-polished. The mirror-polished observation surface is electrolytically etched in a 7% potassium hydroxide etching solution to reveal the microstructure. The observation surface on which the microstructure has been revealed is observed in 10 fields of view using an optical microscope.

The area of the observation field of view region is not particularly limited, and for example is $6.25 \times 10^4$ μm² (at a magnification of 400 times).

In each field of view, ferrite and austenite are identified based on contrast. Area ratios of the identified ferrite and austenite are determined. The method for obtaining the area ratios of the identified ferrite and austenite is not particularly limited, and a well-known method may be used. For example, the area ratios can be determined by image analysis. In the present embodiment, an arithmetic average value of the area ratios of ferrite determined in all of the fields of view is defined as the volume ratio (%) of ferrite.

As described above, the duplex stainless steel seamless pipe according to the present embodiment may contain precipitates, inclusions, etc., in addition to ferrite and austenite in the microstructure. However, as described above, the volume ratios of precipitates, inclusions, etc., are negligibly low as compared with the volume ratios of ferrite and austenite. Therefore, in the present description, when a total volume ratio of ferrite and austenite is calculated by the above-described method, the volume ratios of precipitates, inclusions, etc., will be ignored.

[Number of Intersections with Ferrite Interface]

In the microstructure of the duplex stainless steel seamless pipe according to the present embodiment, in addition, as illustrated in FIG. 4, in an observation field of view region 50 having a size of 250 μm×250 μm, a number of intersections NT in the T direction is 65 or more and a number of intersections NC in the C direction is 50 or more. In the present embodiment, the number of intersections NT in the T direction and the number of intersections NC in the C direction in an observation field of view region having a size of 250 μm×250 μm of the microstructure of the duplex stainless steel seamless pipe can be observed by the following method.

Similarly to the method for determining the volume ratio of ferrite described above, a test specimen for microstructure observation having an observation surface including the T direction and C direction is taken from the center portion of the wall thickness of the duplex stainless steel seamless pipe. As described above, the test specimen is taken so that the test specimen has an observation surface of 5 mm in the C direction×5 mm in the T direction and a center position of the observation surface in the T direction substantially coincides with the center portion of the wall thickness of the duplex stainless steel seamless pipe. The observation surface of the taken test specimen is mirror-polished. The mirror-polished observation surface is electrolytically etched in a 7% potassium hydroxide etching solution to reveal the microstructure. The observation surface in which the microstructure is revealed is observed in 10 fields of view using an optical microscope. The area of the observation field of view region is 250 μm×250 μm=$6.25 \times 10^4$ μm² (at a magnification of 400 times).

FIG. 3 and FIG. 4 are schematic diagrams for describing an index of the distribution state of the microstructure in the present embodiment using FIG. 1 and FIG. 2. FIG. 1 to FIG. 4 show schematic diagrams of the microstructure of a cross section with sides of 250 μm which is located at a center portion of the wall thickness of the duplex stainless steel seamless pipe of the present embodiment, and which includes the C direction and the T direction. Referring to FIG. 4, in the cross section including the C direction (direction perpendicular to the pipe axis direction and pipe radius direction) and the T direction (pipe radius direction) at the center portion of the wall thickness of the duplex stainless steel seamless pipe, a square region whose sides extending in the C direction are 250 μm long and whose sides extending in the T direction are 250 μm long is taken as the observation field of view region 50. In FIG. 3, the observation field of view region 50 includes ferrite 10 (hatched regions in the figure) and austenite 20 (white regions in the figure). In an actual observation field of view region 50 which has been etched, as described above, those skilled in the art can distinguish between ferrite and austenite based on contrast.

In the observation field of view region 50, as illustrated in FIG. 4, line segments extending in the T direction which are arranged at equal intervals in the C direction of the observation field of view region 50 and which divide the observation field of view region 50 into five equal parts in the C direction are defined as line segments T1 to T4. Further, the number of intersections (marked with "●" in FIG. 4) between the line segments T1 to T4 and ferrite interfaces in the observation field of view region 50 is defined as a number of intersections NT. In addition, line segments extending in the C direction which are arranged at equal intervals in the T direction of the observation field of view region 50 and which divide the observation field of view region 50 into five equal parts in the T direction are defined as line segments C1 to C4. The number of intersections (marked with "◇" in FIG. 4) between the line segments C1 to C4 and the ferrite interfaces in the observation field of view region 50 is defined as a number of intersections NC.

In the microstructure of the duplex stainless steel seamless pipe according to the present embodiment, in the observation field of view region 50 described above, the number of intersections NT is 65 or more and the number of intersections NC is 50 or more. In this case, a yield strength of 415 MPa or more and excellent HISC resistance can both be achieved in a compatible manner in the duplex stainless steel seamless pipe.

A lower limit of the number of intersections NT in the T direction is preferably 80, more preferably 100, further preferably 120, and further preferably 130. An upper limit of the number of intersections NT is not particularly limited, and for example is 500. A lower limit of the number of intersections NC in the C direction is preferably 60, more preferably 70, further preferably 80, and further preferably 100. An upper limit of the number of intersections NC is not particularly limited, and for example is 300.

In the present description, the number of intersections NT of the duplex stainless steel seamless pipe of the present embodiment means an arithmetic average value of the number of intersections NT obtained in each of an arbitrary 10 observation field of view regions in the observation surface of the test specimen taken by the above-described method. Further, the number of intersections NC of the duplex stainless steel seamless pipe of the present embodiment means an arithmetic average value of the number of intersections NC obtained in each of an arbitrary 10 observation field of view regions in the observation surface of the test specimen taken by the above-described method.

[Yield Strength]

The yield strength of the duplex stainless steel seamless pipe according to the present embodiment is 415 MPa or more. By having the chemical composition and microstructure described above, the duplex stainless steel seamless pipe according to the present embodiment has the excellent HISC resistance even when the yield strength thereof is 415 MPa or more.

A lower limit of the yield strength of the duplex stainless steel seamless pipe according to the present embodiment is preferably 430 MPa. and more preferably 450 MPa. Note that, although not particularly limited, an upper limit of the yield strength of the duplex stainless steel seamless pipe according to the present embodiment is, for example, 965 MPa.

The yield strength of the duplex stainless steel seamless pipe according to the present embodiment can be determined by the following method. Specifically, a tensile test is performed by a method conforming to ASTM E8/E8M (2013). A round bar test specimen is taken from the center portion of the wall thickness of the steel seamless pipe according to the present embodiment. The size of the round bar test specimen is, for example, as follows: the parallel portion diameter is 6 mm and the parallel portion length is 30 mm. Note that the axial direction of the round bar test specimen is parallel to the pipe axis direction (L direction) of the steel seamless pipe. A tensile test is carried out in the atmosphere at room temperature (25° C.) using the round bar test specimen. The 0.2% offset proof stress obtained by the tensile test carried out under the above conditions is defined as the yield strength (MPa).

[HISC Resistance]

By having the aforementioned chemical composition and the aforementioned microstructure, the duplex stainless steel seamless pipe according to the present embodiment has the excellent HISC resistance. In the present embodiment, "excellent HISC resistance" is defined as follows.

A V-notch test specimen for use in a HISC resistance test is taken from a center portion of the wall thickness of the steel seamless pipe according to the present embodiment. The shape of the V-notch test specimen is not particularly limited. Specifically, in the V-notch test specimen, for example, a cross section of a parallel portion is a rectangle with sides of 7.5 mm, and the length of the parallel portion is 25.4 mm. Here, the longitudinal direction of the V-notch test specimen is parallel to the pipe axis direction of the steel seamless pipe. At the center position in the longitudinal direction of the parallel portion of the V-notch test specimen (that is, the center position of the parallel portion length of 25.4 mm), a V-notch is formed at a location corresponding to the surface side of the steel seamless pipe. The direction of the V-notch is made parallel to the pipe radius direction of the steel seamless pipe, the angle of the V-notch is made 45°, and the depth of the V-notch is made 1.5 mm.

The taken V-notch test specimen is subjected to precharging. Specifically, a 3.5 weight % sodium chloride aqueous solution is heated to 80° C. and adopted as a test solution for precharging. The aforementioned V-notch test specimen and a reference electrode are immersed in the test solution for precharging. Note that, in the present embodiment, a saturated calomel electrode is used as the reference electrode. A potential of −1050 mV is applied to the V-notch test specimen, and the V-notch test specimen is held for 30 days under the conditions.

After being precharged, the V-notch test specimen is subjected to a HISC test. Specifically, a stress equivalent to 85% of the actual yield stress is applied to the V-notch test specimen after precharging, in the longitudinal direction thereof. A 3.5 weight % sodium chloride aqueous solution is held at 4° C., and adopted as a test solution for the HISC test. The V-notch test specimen to which the stress was applied and a reference electrode (saturated calomel electrode) are immersed in the test solution for the HISC test. A potential of −1050 mV is applied to the V-notch test specimen, and the V-notch test specimen is held for 30 days under the conditions.

As the result of the above test, if cracking is not confirmed in the V-notch test specimen after being held for 30 days, in the present embodiment it is determined that the steel seamless pipe from which the V-notch test specimen is taken has the excellent HISC resistance. Note that, as used herein, the phrase "cracking is not confirmed" means that cracking is not confirmed in the V-notch test specimen as a result of observation of the V-notch test specimen after the test with the naked eye and by means of a projector with a magnification of 10×.

In the duplex stainless steel seamless pipe according to the present embodiment, preferably the number of intersections NC in the C direction is 100 or more. In this case, the duplex stainless steel seamless pipe according to the present embodiment has even more excellent HISC resistance. In the present embodiment, the phrase "even more excellent HISC resistance" is defined as follows.

A test is performed that is the same as the HISC resistance test described above except that the stress applied to the V-notch test specimen is set to a stress equivalent to 93% of the actual yield stress. As the result of the test, if cracking is not confirmed in the V-notch test specimen after being held for 30 days, in the present embodiment it is determined that the steel seamless pipe from which the V-notch test specimen is taken has even more excellent HISC resistance. Note that, as used herein, the phrase "cracking is not confirmed" means that cracking is not confirmed in the V-notch test specimen as a result of observation of the V-notch test specimen after the test with the naked eye and by means of a projector with a magnification of 10×.

[Production Method]

One example of a method for producing the duplex stainless steel seamless pipe according to the present embodiment which has the above-described configuration will now be described. Note that a method for producing the duplex stainless steel seamless pipe according to the present embodiment is not limited to the production method described below.

One example of a method for producing the duplex stainless steel seamless pipe according to the present embodiment includes a step of preparing a starting material (starting material preparation step), a step of subjecting the starting material to hot working to produce a hollow shell (hot working step), and a step of performing a solution treatment to produce a steel seamless pipe (solution treatment step). Hereinafter, each production step will be described in detail.

[Starting Material Preparation Step]

In the starting material preparation step, a starting material having the above-described chemical composition is prepared. The starting material may be prepared by producing the starting material, or may be prepared by purchasing the starting material from a third party. In other words, the method for preparing the starting material is not particularly limited.

In the case of producing the starting material, for example, the starting material is produced by the following method. A molten steel having the above-described chemical composition is produced. A cast piece (a slab, a bloom, or a billet) is produced by a continuous casting method using the molten steel. An ingot may be produced by an ingot-making process using the molten steel. As needed, a slab, a bloom or an ingot may be subjected to blooming to produce a billet. The starting material is produced by the step described above.

[Hot Working Step]

In the hot working step, the prepared starting material is subjected to hot working to produce a hollow shell. First, the starting material is heated in a heating furnace. The heating temperature is not particularly limited, and for example is 1000 to 1300° C. Hot working is performed on the starting material that is extracted from the heating furnace. In the present embodiment, the hot working is not particularly limited as long as the hot working satisfies conditions to be described later. The hot working may be hot rolling or may be hot extrusion. In the case of performing hot rolling as the hot working, for example, the Mannesmann process may be performed to produce a hollow shell. In the case of performing the Mannesmann process, the starting material (a round billet) is subjected to piercing-rolling using a piercing machine. When performing piercing-rolling, although not particularly limited, for example, the piercing ratio is 1.0 to 4.0. The hollow round billet subjected to piercing-rolling is further subjected to hot rolling with a mandrel mill, a reducer, a sizing mill or the like to produce a hollow shell.

In the case of performing hot extrusion as the hot working, for example, the Ugine-Sejournet process or the Ehrhardt push bench process may be performed to produce a hollow shell. Note that hot working may be performed only one time or may be performed multiple times. For example, after performing the aforementioned piercing-rolling on the starting material, the aforementioned hot extrusion may be performed.

Preferably, the working time in the hot working step according to the present embodiment is 15 minutes or less. The term "working time (mins)" means a time period from when the starting material is extracted from the heating furnace until the final hot working ends. If the working time is too long, ferrite and austenite will become coarse. As a result, in the microstructure of the duplex stainless steel seamless pipe that is produced, the number of intersections NC with ferrite interfaces in the C direction will decrease. On the other hand, if the working time is short, coarsening of ferrite and austenite can be suppressed. As a result, in the microstructure of the duplex stainless steel seamless pipe that is produced, the number of intersections NC with ferrite interfaces in the C direction will be large.

Therefore, in the present embodiment, the working time is preferably set to 15 minutes or less. A more preferable upper limit of the working time is 14 minutes, and further preferably is 13 minutes. A lower limit of the working time is not particularly limited, and for example is 5 minutes.

Preferably, in the hot working step according to the present embodiment, an area reduction ratio R of the hot working is 30% or more. The area reduction ratio R is defined by the following Formula (A).

$$R = \{1 - (\text{cross-sectional area perpendicular to pipe axis direction of hollow shell after hot working} / \text{cross-sectional area perpendicular to axial direction of starting material before hot working})\} \times 100 \quad (A)$$

Note that, the phrase "hollow shell after hot working" in Formula (A) means the hollow shell after the final hot working ended. The phrase "starting material before hot working" in Formula (A) means the starting material before performing hot working. In other words, in the hot working step according to the present embodiment, the area reduction ratio R is defined by the cross-sectional area perpendicular to the axial direction of the starting material that is changed by the hot working.

If the area reduction ratio R in the hot working step is large, a shearing force is applied in the pipe radius direction (T direction) during working, and the ferrite grains can be made fine in the microstructure of the produced duplex stainless steel seamless pipe. As a result, in the microstructure of the produced duplex stainless steel seamless pipe, the number of intersections NT with ferrite interfaces in the T direction will be large.

Therefore, in the hot working step according to the present embodiment, preferably the area reduction ratio R is made 30% or more. A lower limit of the area reduction ratio R is more preferably 33%, further preferably 35%, and further preferably 38%. In the present embodiment, an upper limit of the area reduction ratio R is not particularly limited, and for example is 80%.

[Solution Treatment Step]

In the solution treatment step, the hollow shell produced by the aforementioned hot working step is subjected to a solution treatment. A method for performing the solution treatment is not particularly limited, and a well-known method may be used. For example, the hollow shell is charged into a heat treatment furnace, and after being held at a predetermined temperature, is rapidly cooled. Note that, in the case of performing a solution treatment by charging the hollow shell into a heat treatment furnace, holding the hollow shell at a predetermined temperature, and thereafter rapidly cooling the hollow shell, the temperature at which the solution treatment is performed (solution treatment temperature) means the temperature (° C.) of the heat treatment furnace for performing the solution treatment. In this case, in addition, the time for which the solution treatment is performed (solution treatment time) means the time for which the hollow shell is held at the solution treatment temperature.

Preferably, the solution treatment temperature in the solution treatment step of the present embodiment is set to 900 to 1200° C. If the solution treatment temperature is too low, precipitates (for example, a σ phase that is an intermetallic compound or the like) may remain in the steel seamless pipe after the solution treatment. In this case, the corrosion resistance of the steel seamless pipe will deteriorate. Furthermore, if the solution treatment temperature is too low, the volume ratio of ferrite in the steel seamless pipe after the solution treatment will be less than 30% in some cases. In such a case, the yield strength of the steel seamless pipe will decrease. On the other hand, if the solution treatment temperature is too high, the volume ratio of ferrite in the steel seamless pipe after the solution treatment will be more than 55% in some cases. In such a case, the HISC resistance of the steel seamless pipe will decrease.

Therefore, when performing a solution treatment by charging the steel seamless pipe into a heat treatment furnace, holding the steel seamless pipe at a desired temperature, and thereafter performing rapid cooling, the solution treatment temperature is preferably set within the range of 900 to 1200° C. A lower limit of the solution treatment temperature is more preferably 920° C., and further preferably 940° C. An upper limit of the solution treatment temperature is more preferably 1180° C., and further preferably 1160° C.

When performing a solution treatment by charging the steel seamless pipe into a heat treatment furnace, holding the steel seamless pipe at a desired temperature, and thereafter performing rapid cooling, the solution treatment time is not particularly limited, and may be in accordance with a well-known condition. The solution treatment time is, for example, 5 to 180 minutes. The rapid cooling method is, for example, water cooling.

[Other Steps]

The production method according to the present embodiment may include production steps other than the production steps described above. For example, the steel seamless pipe after the solution treatment step may be subjected to cold working. In the present description, "cold working" may be cold drawing or may be cold rolling. In a case where the steel seamless pipe after the solution treatment is subjected to cold working, the yield strength of the steel seamless pipe further increases. Specifically, if the reduction rate in the cold working (that is, the area reduction ratio obtained by performing the cold working) is 3% or more, the yield strength of the steel seamless pipe according to the present embodiment can be increased to 700 MPa or more. Note that, as the result of having the above-described chemical composition and the above-described microstructure, the steel seamless pipe according to the present embodiment has the excellent HISC resistance even when the yield strength is 700 MPa or more.

In the production method according to the present embodiment, in addition, for example, cold working may be performed on the hollow shell at a stage that is after the hot working step and is before the solution treatment step. In this case, the yield strength of the produced duplex stainless steel seamless pipe increases further. Furthermore, in the production method according to the present embodiment, a pickling treatment may be performed after the solution treatment step. In this case, the pickling treatment is not particularly limited, and it suffices that the pickling treatment is performed by a well-known method. When a pickling treatment is performed, a passivation film is formed on the surface of the produced duplex stainless steel seamless pipe, and the corrosion resistance of the duplex stainless steel seamless pipe is further enhanced.

Through the steps described above, the duplex stainless steel seamless pipe according to the present embodiment can be produced. Note that the method for producing the duplex stainless steel seamless pipe described above is one example, and the duplex stainless steel seamless pipe may be produced by another method. Specifically, as long as a duplex stainless steel seamless pipe that has the aforementioned chemical composition and whose microstructure consists of 30 to 55% of ferrite in volume ratio with the balance being austenite, and in which the yield strength is 415 MPa or more, the number of intersections NT in the T direction is 65 or more, and the number of intersections NC in the C direction is 50 or more can be produced, a method for producing the duplex stainless steel seamless pipe is not limited to the production method described above, and may be another method. Hereunder, the present invention is described more specifically by way of Examples.

Examples

Cast pieces (slabs) having a rectangular cross section were cast using molten steels having the chemical compositions shown in Table 1 and Table 2. Note that, the symbol "—" in Table 1 and Table 2 means that the content of the corresponding element was at an impurity level. Specifically, the symbol "—" means that the W content, Sb content, Sn content, Nb content, Ta content, Ti content, Zr content, Hf content, and REM content of steel A were each 0% when rounded off to three decimal places. For example, in addition, the symbol "—" means that the Co content of steel A was 0% when rounded off to two decimal places. For example, furthermore, the symbol "—" means that the B content of steel A was 0% when rounded off to four decimal places.

TABLE 1

| Chemical composition (in mass %, the balance being Fe and impurities) | | | | | | | | | | | | |
|---|---|---|---|---|---|---|---|---|---|---|---|---|
| Steel | C | Si | Mn | P | S | Al | Ni | Cr | Mo | Cu | N | V | Ca |
| A | 0.014 | 0.53 | 1.18 | 0.020 | 0.0004 | 0.033 | 6.07 | 24.99 | 1.45 | 2.51 | 0.189 | 0.09 | 0.0030 |
| B | 0.015 | 0.55 | 1.52 | 0.019 | 0.0004 | 0.036 | 4.97 | 25.75 | 1.08 | 2.57 | 0.210 | 0.12 | — |
| C | 0.014 | 0.50 | 1.03 | 0.020 | 0.0002 | 0.027 | 4.99 | 25.48 | 1.03 | 2.63 | 0.204 | 0.11 | 0.0024 |
| D | 0.013 | 0.43 | 3.05 | 0.022 | 0.0003 | 0.015 | 5.20 | 25.66 | 1.14 | 3.01 | 0.199 | 0.09 | 0.0025 |
| E | 0.013 | 0.56 | 1.14 | 0.019 | 0.0005 | 0.075 | 5.29 | 26.21 | 1.12 | 3.62 | 0.218 | 0.11 | — |
| F | 0.015 | 0.52 | 3.10 | 0.020 | 0.0005 | 0.080 | 4.81 | 25.20 | 0.99 | 3.20 | 0.216 | 0.10 | 0.0022 |
| G | 0.015 | 0.51 | 5.05 | 0.019 | 0.0005 | 0.077 | 4.80 | 25.13 | 0.99 | 2.50 | 0.233 | 0.10 | 0.0020 |
| H | 0.015 | 0.52 | 3.10 | 0.020 | 0.0005 | 0.080 | 4.81 | 25.20 | 0.99 | 3.20 | 0.216 | 0.10 | 0.0022 |
| I | 0.015 | 0.52 | 5.06 | 0.019 | 0.0005 | 0.033 | 6.25 | 27.64 | 1.48 | 3.19 | 0.228 | 0.09 | 0.0027 |
| J | 0.014 | 0.52 | 0.97 | 0.021 | 0.0002 | 0.014 | 5.03 | 25.00 | 1.10 | 2.44 | 0.187 | 0.05 | 0.0023 |
| K | 0.014 | 0.51 | 1.02 | 0.020 | 0.0002 | 0.026 | 5.01 | 25.48 | 1.04 | 2.55 | 0.204 | 0.11 | — |
| L | 0.015 | 0.44 | 2.53 | 0.016 | 0.0005 | 0.023 | 3.04 | 25.20 | 0.89 | 2.13 | 0.205 | 0.11 | 0.0017 |
| M | 0.014 | 0.53 | 6.14 | 0.016 | 0.0005 | 0.044 | 6.59 | 29.58 | 1.02 | 3.95 | 0.214 | 0.10 | — |
| N | 0.015 | 0.52 | 1.18 | 0.019 | 0.0004 | 0.033 | 6.07 | 24.98 | 1.45 | 2.52 | 0.189 | 0.11 | 0.0029 |
| O | 0.014 | 0.55 | 3.05 | 0.020 | 0.0003 | 0.015 | 5.17 | 25.65 | 1.14 | 3.02 | 0.199 | 0.09 | 0.0025 |
| P | 0.014 | 0.43 | 1.49 | 0.020 | 0.0004 | 0.030 | 4.97 | 25.78 | 1.08 | 2.56 | 0.210 | 0.12 | — |
| Q | 0.013 | 0.48 | 1.02 | 0.022 | 0.0002 | 0.028 | 5.01 | 25.44 | 1.03 | 2.62 | 0.204 | 0.11 | 0.0028 |
| R | 0.015 | 0.51 | 1.18 | 0.021 | 0.0005 | 0.075 | 5.29 | 26.21 | 1.11 | 3.61 | 0.218 | 0.09 | — |
| S | 0.016 | 0.53 | 3.10 | 0.019 | 0.0002 | 0.066 | 4.81 | 25.20 | 0.98 | 3.19 | 0.216 | 0.10 | 0.0022 |
| T | 0.014 | 0.52 | 3.10 | 0.013 | 0.0003 | 0.045 | 4.92 | 25.20 | 0.99 | 3.20 | 0.216 | 0.05 | 0.0021 |
| U | 0.014 | 0.55 | 1.00 | 0.014 | 0.0002 | 0.025 | 5.01 | 25.48 | 1.04 | 2.54 | 0.204 | 0.11 | — |
| V | 0.015 | 0.50 | 5.05 | 0.022 | 0.0009 | 0.077 | 4.83 | 25.13 | 0.98 | 2.50 | 0.233 | 0.10 | 0.0019 |
| W | 0.013 | 0.51 | 5.10 | 0.022 | 0.0003 | 0.045 | 6.22 | 27.64 | 1.48 | 3.18 | 0.228 | 0.10 | 0.0027 |
| X | 0.014 | 0.52 | 0.97 | 0.020 | 0.0002 | 0.052 | 5.03 | 25.00 | 1.11 | 2.43 | 0.187 | 0.05 | 0.0024 |
| Y | 0.015 | 0.48 | 2.78 | 0.018 | 0.0004 | 0.031 | 3.10 | 25.20 | 0.89 | 2.13 | 0.205 | 0.10 | 0.0017 |
| Z | 0.015 | 0.50 | 6.19 | 0.019 | 0.0003 | 0.044 | 6.59 | 29.58 | 1.02 | 3.94 | 0.214 | 0.11 | — |

| Steel | Mg | W | Co | Sb | Sn | Nb | Ta | Ti | Zr | Hf | B | REM |
|---|---|---|---|---|---|---|---|---|---|---|---|---|
| A | 0.0020 | — | — | — | — | — | — | — | — | — | — | — |
| B | 0.0021 | 0.120 | — | — | — | — | — | — | — | — | — | — |
| C | 0.0019 | — | 0.15 | — | — | — | — | — | — | — | — | — |
| D | 0.0018 | — | — | — | — | — | — | — | 0.003 | — | — | — |
| E | 0.0019 | — | — | 0.002 | — | — | — | — | — | — | — | — |
| F | — | 0.030 | 0.14 | — | — | — | — | 0.001 | — | — | — | — |

TABLE 1-continued

Chemical composition (in mass %, the balance being Fe and impurities)

| Steel | | | | | | | | | | | | |
|---|---|---|---|---|---|---|---|---|---|---|---|---|
| G | — | — | 0.14 | 0.001 | — | — | — | 0.002 | — | — | 0.0020 | — |
| H | — | — | — | — | — | — | 0.002 | — | — | 0.001 | 0.0019 | — |
| I | 0.0013 | 0.140 | 0.19 | — | — | — | — | — | 0.002 | — | 0.0020 | 0.010 |
| J | — | — | — | 0.002 | 0.001 | 0.002 | — | — | — | — | 0.0023 | — |
| K | 0.0019 | — | — | — | — | — | — | — | — | — | 0.0020 | 0.020 |
| L | — | — | 0.09 | — | 0.001 | — | — | — | — | — | 0.0021 | — |
| M | 0.0024 | — | 0.20 | 0.002 | — | — | — | — | — | 0.002 | — | — |
| N | 0.0020 | — | — | — | — | — | — | — | — | — | — | — |
| O | 0.0018 | — | — | — | — | — | — | 0.003 | — | — | — | — |
| P | 0.0019 | 0.140 | — | — | — | — | — | — | — | — | — | — |
| Q | 0.0021 | — | 0.15 | — | — | — | — | — | — | — | — | — |
| R | 0.0019 | — | — | — | 0.002 | — | — | — | — | — | — | — |
| S | — | — | — | — | — | — | 0.001 | — | — | 0.002 | 0.0022 | — |
| T | — | 0.120 | 0.15 | — | — | — | — | 0.002 | — | — | — | — |
| U | 0.0020 | — | — | — | — | — | — | — | — | — | 0.0021 | 0.010 |
| V | — | — | 0.14 | 0.002 | — | — | — | 0.003 | — | — | 0.0019 | — |
| W | 0.0021 | 0.160 | 0.19 | — | — | — | — | — | 0.002 | — | 0.0020 | 0.020 |
| X | — | — | — | 0.001 | 0.001 | 0.001 | — | — | — | — | 0.0022 | — |
| Y | — | — | 0.09 | — | 0.002 | — | — | — | — | — | 0.0018 | — |
| Z | 0.0022 | — | 0.20 | 0.001 | — | — | — | — | — | 0.002 | — | — |

TABLE 2

Chemical composition (in mass %, the balance being Fe and impurities)

| Steel | C | Si | Mn | P | S | Al | Ni | Cr | Mo | Cu | N | V | Ca |
|---|---|---|---|---|---|---|---|---|---|---|---|---|---|
| AA | 0.015 | 0.43 | 1.30 | 0.020 | 0.0005 | 0.022 | 5.50 | 22.25 | 3.23 | 0.22 | 0.189 | 0.09 | 0.0020 |
| AB | 0.018 | 0.48 | 1.17 | 0.020 | 0.0002 | 0.026 | 5.22 | 23.14 | 3.10 | 0.17 | 0.178 | 0.11 | — |
| AC | 0.023 | 0.47 | 1.20 | 0.023 | 0.0005 | 0.018 | 5.18 | 22.50 | 3.16 | 0.17 | 0.172 | 0.11 | 0.0027 |
| AD | 0.020 | 0.49 | 1.32 | 0.021 | 0.0004 | 0.021 | 5.31 | 22.99 | 3.34 | 0.24 | 0.178 | 0.15 | 0.0021 |
| AE | 0.022 | 0.51 | 1.28 | 0.018 | 0.0004 | 0.025 | 5.71 | 23.06 | 3.01 | 0.18 | 0.196 | 0.14 | 0.0022 |
| AF | 0.023 | 0.46 | 1.19 | 0.024 | 0.0005 | 0.017 | 5.15 | 22.52 | 3.15 | 0.17 | 0.169 | 0.11 | 0.0023 |
| AG | 0.026 | 0.46 | 1.19 | 0.019 | 0.0004 | 0.015 | 5.20 | 22.70 | 3.21 | 0.13 | 0.177 | 0.13 | 0.0018 |
| AH | 0.020 | 0.52 | 3.10 | 0.014 | 0.0004 | 0.022 | 4.92 | 23.28 | 3.48 | 0.20 | 0.199 | 0.10 | — |
| AI | 0.016 | 0.50 | 1.46 | 0.019 | 0.0005 | 0.024 | 5.59 | 22.63 | 2.99 | 0.19 | 0.181 | 0.05 | 0.0027 |
| AJ | 0.014 | 0.52 | 0.97 | 0.021 | 0.0002 | 0.014 | 5.33 | 22.63 | 3.02 | 0.15 | 0.187 | 0.09 | 0.0019 |
| AK | 0.019 | 0.49 | 1.59 | 0.017 | 0.0005 | 0.016 | 3.24 | 22.47 | 3.07 | 0.22 | 0.194 | 0.10 | — |
| AL | 0.016 | 0.49 | 0.99 | 0.020 | 0.0005 | 0.023 | 4.82 | 28.49 | 2.99 | 0.20 | 0.205 | 0.11 | 0.0017 |
| AM | 0.016 | 0.45 | 1.33 | 0.020 | 0.0004 | 0.037 | 5.41 | 23.48 | 3.01 | 0.25 | 0.199 | 0.10 | 0.0025 |
| AN | 0.014 | 0.55 | 0.97 | 0.021 | 0.0002 | 0.014 | 5.33 | 24.36 | 3.02 | 0.31 | 0.187 | 0.09 | 0.0019 |
| AO | 0.015 | 0.43 | 0.87 | 0.019 | 0.0003 | 0.021 | 6.30 | 25.05 | 3.54 | 0.50 | 0.294 | 0.09 | 0.0020 |
| AP | 0.019 | 0.22 | 0.71 | 0.022 | 0.0002 | 0.011 | 6.13 | 24.82 | 3.81 | 0.49 | 0.199 | 0.07 | 0.0027 |
| AQ | 0.021 | 0.28 | 0.66 | 0.019 | 0.0003 | 0.016 | 6.33 | 26.03 | 2.99 | 0.61 | 0.311 | 0.11 | — |
| AR | 0.016 | 0.39 | 0.98 | 0.018 | 0.0004 | 0.017 | 6.11 | 25.00 | 3.02 | 0.47 | 0.301 | 0.10 | 0.0021 |
| AS | 0.016 | 0.24 | 0.69 | 0.020 | 0.0004 | 0.018 | 7.14 | 24.90 | 3.11 | 0.52 | 0.296 | 0.05 | — |
| AT | 0.018 | 0.29 | 0.48 | 0.021 | 0.0002 | 0.007 | 6.82 | 27.21 | 3.12 | 0.53 | 0.300 | 0.08 | — |
| AU | 0.015 | 0.24 | 0.70 | 0.020 | 0.0003 | 0.015 | 6.28 | 24.80 | 3.16 | 0.49 | 0.281 | 0.06 | 0,0015 |
| AV | 0.017 | 0.24 | 0.70 | 0.020 | 0.0004 | 0.018 | 6.26 | 24.89 | 3.11 | 0.52 | 0.296 | 0.05 | 0.0016 |
| AW | 0.022 | 0.24 | 0.73 | 0.019 | 0.0002 | 0.019 | 5.89 | 24.81 | 2.84 | 0.44 | 0.287 | 0.08 | — |
| AX | 0.015 | 0.46 | 0.82 | 0.021 | 0.0003 | 0.020 | 5.84 | 25.87 | 3.46 | 0.77 | 0.271 | 0.10 | 0.0019 |
| AY | 0.020 | 0.26 | 1.21 | 0.017 | 0.0003 | 0.031 | 3.23 | 25.12 | 3.09 | 0.55 | 0.236 | 0.06 | — |
| AZ | 0.023 | 0.31 | 0.94 | 0.017 | 0.0004 | 0.019 | 5.97 | 29.74 | 3.00 | 0.74 | 0.254 | 0.10 | 0.0017 |
| BA | 0.015 | 0.43 | 0.87 | 0.019 | 0.0003 | 0.021 | 6.30 | 25.05 | 3.54 | 0.50 | 0.294 | 0.09 | 0.0020 |
| BB | 0.022 | 0.24 | 0.73 | 0.019 | 0.0002 | 0.019 | 5.99 | 24.81 | 2.84 | 0.44 | 0.287 | 0.10 | — |

| Steel | Mg | W | Cg | Sb | Sn | Nb | Ta | Ti | Zr | Hf | B | REM |
|---|---|---|---|---|---|---|---|---|---|---|---|---|
| AA | 0.0020 | — | — | — | — | — | — | — | — | — | — | — |
| AB | 0.0018 | 0.100 | — | — | — | — | — | — | — | — | — | — |
| AC | — | — | 0.16 | — | — | — | — | — | — | — | — | — |
| AD | — | — | — | — | — | — | — | 0.002 | — | — | — | — |
| AE | 0.0019 | — | — | — | — | — | — | — | — | — | 0.0019 | — |
| AF | — | 0.040 | 0.15 | — | — | — | — | 0.003 | — | — | 0.0022 | — |
| AG | — | — | 0.16 | 0.001 | — | — | — | — | 0.002 | — | — | — |
| AH | 0.0019 | — | 0.15 | — | 0.002 | — | 0.002 | 0.002 | — | — | 0.0018 | — |
| AI | 0.0013 | 0.130 | 0.17 | — | — | — | — | — | — | 0.002 | 0.0020 | 0.010 |
| AJ | — | — | 0.16 | 0.002 | — | 0.010 | 0.001 | — | — | — | — | — |
| AK | 0.0023 | — | 0.10 | — | — | 0.022 | — | — | — | — | 0.0021 | 0.010 |
| AL | — | — | 0.14 | — | 0.001 | — | — | — | — | — | 0.0025 | — |
| AM | 0.0018 | — | — | — | — | — | — | — | — | — | — | — |
| AN | — | — | — | — | 0.002 | — | 0.002 | — | — | — | — | — |
| AO | 0.0018 | 2.060 | — | — | — | — | — | — | — | — | — | — |
| AP | 0.0013 | 2.340 | 0.11 | — | — | — | — | — | — | — | — | — |
| AQ | 0.0019 | 2.220 | — | — | — | — | — | 0.002 | — | — | — | — |

TABLE 2-continued

Chemical composition (in mass %, the balance being Fe and impurities)

| | | | | | | | | | | | | |
|---|---|---|---|---|---|---|---|---|---|---|---|---|
| AR | — | 2.140 | — | — | — | — | — | — | — | — | 0.0028 | — |
| AS | 0.0015 | 2.080 | 0.19 | 0.001 | 0.002 | — | — | — | 0.001 | — | — | — |
| AT | 0.0019 | 2.090 | 0.14 | — | — | — | — | — | — | — | 0.0018 | — |
| AU | — | 2.120 | 0.23 | 0.001 | — | 0.010 | 0.002 | — | — | — | 0.0020 | — |
| AV | 0.0003 | 2.080 | 0.17 | 0.001 | — | 0.006 | — | 0.003 | — | — | 0.0030 | — |
| AW | 0.0021 | 2.380 | 0.09 | — | — | — | — | — | — | — | — | — |
| AX | — | 2.430 | 0.10 | 0.002 | — | — | 0.002 | — | — | 0.001 | — | 0.010 |
| AY | 0.0021 | 2.100 | 0.09 | — | — | — | — | — | — | 0.001 | — | 0.010 |
| AZ | — | 2.000 | 0.09 | — | — | — | — | 0.001 | — | — | 0.0025 | — |
| BA | 0.0018 | 2.060 | — | — | — | — | — | — | — | — | — | — |
| BB | 0.0021 | 2.380 | — | — | — | — | — | 0.002 | — | — | — | 0.002 |

The slab of each Test Number was heated at 1250° C., and thereafter subjected to blooming to produce a round billet having a circular cross section. After heating the round billet of each Test Number at 1200° C., hot rolling was performed as hot working to produce a hollow shell (steel seamless pipe) having an external diameter of 323.9 mm and a wall thickness of 24.5 mm. The area reduction ratio R (%) in the hot working (hot rolling) for each Test Number is shown in Table 3 to Table 5. In addition, the time period (working time) from when the round billet was extracted from the heating furnace until the final hot working (hot rolling) ended is shown in Table 3 to Table 5.

TABLE 3

| | | Hot working | | | Microstructure | | | | |
|---|---|---|---|---|---|---|---|---|---|
| Test Number | Steel | Area reduction ratio R (%) | Working time (mins) | Solution treatment temperature (° C.) | Ferrite volume ratio (%) | NT (intersections) | NC (intersections) | YS (MPa) | HISC resistance test |
| 1 | A | 57 | 8 | 1000 | 45 | 148 | 114 | 474 | E |
| 2 | B | 62 | 8 | 1050 | 42 | 145 | 106 | 578 | E |
| 3 | C | 46 | 10 | 1050 | 48 | 136 | 88 | 576 | G |
| 4 | D | 55 | 11 | 1000 | 50 | 124 | 95 | 632 | G |
| 5 | E | 50 | 10 | 1050 | 48 | 149 | 94 | 497 | G |
| 6 | F | 59 | 13 | 1000 | 42 | 163 | 87 | 607 | G |
| 7 | G | 62 | 8 | 1000 | 40 | 135 | 102 | 613 | E |
| 8 | H | 66 | 12 | 980 | 44 | 135 | 113 | 585 | E |
| 9 | I | 69 | 7 | 1050 | 35 | 120 | 127 | 621 | E |
| 10 | J | 68 | 8 | 1000 | 43 | 132 | 118 | 545 | E |
| 11 | K | 45 | 9 | 1050 | 49 | 135 | 87 | 569 | G |
| 12 | E | 49 | 10 | 1250 | 65 | 77 | 85 | 653 | NA |
| 13 | G | 28 | 9 | 1100 | 49 | 60 | 79 | 596 | NA |
| 14 | E | 34 | 18 | 950 | 45 | 97 | 36 | 655 | NA |
| 15 | F | 28 | 20 | 1000 | 52 | 49 | 46 | 650 | NA |
| 16 | L | 55 | 8 | 1000 | 62 | 111 | 87 | 605 | NA |
| 17 | M | 47 | 8 | 1050 | 59 | 106 | 60 | 640 | NA |
| 18 | N | 50 | 10 | 1050 | 40 | 129 | 89 | 786 | G |
| 19 | O | 55 | 12 | 1000 | 37 | 131 | 87 | 747 | G |
| 20 | P | 69 | 7 | 1000 | 33 | 142 | 104 | 761 | E |
| 21 | Q | 62 | 8 | 1050 | 35 | 153 | 111 | 772 | E |
| 22 | R | 55 | 12 | 1000 | 35 | 128 | 96 | 783 | G |
| 23 | S | 48 | 12 | 1000 | 49 | 119 | 82 | 789 | G |
| 24 | T | 40 | 13 | 980 | 50 | 107 | 93 | 802 | G |
| 25 | U | 55 | 8 | 1050 | 44 | 138 | 101 | 752 | E |
| 26 | V | 62 | 7 | 1000 | 38 | 140 | 110 | 730 | E |
| 27 | W | 63 | 7 | 1050 | 37 | 142 | 127 | 744 | E |
| 28 | X | 67 | 10 | 1050 | 40 | 154 | 119 | 768 | E |
| 29 | R | 48 | 18 | 1070 | 49 | 81 | 42 | 720 | NA |
| 30 | U | 34 | 12 | 1250 | 66 | 82 | 83 | 803 | NA |
| 31 | O | 29 | 13 | 1000 | 45 | 50 | 78 | 799 | NA |
| 32 | R | 28 | 20 | 1050 | 44 | 63 | 48 | 751 | NA |
| 33 | Y | 49 | 9 | 980 | 58 | 103 | 77 | 821 | NA |
| 34 | Z | 51 | 8 | 1000 | 65 | 99 | 82 | 834 | NA |

TABLE 4

| Test Number | Steel | Hot working Area reduction ratio R (%) | Working time (mins) | Solution treatment temperature (° C.) | Microstructure Ferrite volume ratio (%) | NT (intersections) | NC (intersections) | YS (MPa) | HISC resistance test |
|---|---|---|---|---|---|---|---|---|---|
| 35 | AA | 52 | 8 | 1050 | 42 | 135 | 107 | 501 | E |
| 36 | AB | 43 | 9 | 950 | 50 | 148 | 89 | 555 | G |
| 37 | AC | 50 | 8 | 1000 | 47 | 145 | 108 | 541 | E |
| 38 | AD | 50 | 12 | 1000 | 45 | 120 | 90 | 548 | G |
| 39 | AE | 49 | 7 | 1050 | 36 | 151 | 95 | 439 | G |
| 40 | AF | 58 | 7 | 1050 | 48 | 133 | 113 | 528 | E |
| 41 | AG | 60 | 7 | 1050 | 39 | 140 | 118 | 489 | E |
| 42 | AH | 64 | 12 | 980 | 44 | 139 | 98 | 532 | G |
| 43 | AI | 69 | 13 | 950 | 49 | 121 | 94 | 457 | G |
| 44 | AJ | 69 | 15 | 1000 | 50 | 108 | 88 | 491 | G |
| 45 | AG | 44 | 12 | 1250 | 63 | 85 | 79 | 602 | NA |
| 46 | AF | 44 | 20 | 950 | 50 | 83 | 47 | 585 | NA |
| 47 | AC | 28 | 20 | 1000 | 52 | 64 | 48 | 535 | NA |
| 48 | AK | 54 | 8 | 1100 | 60 | 96 | 86 | 593 | NA |
| 49 | AL | 60 | 7 | 1150 | 62 | 134 | 81 | 590 | NA |
| 50 | AA | 52 | 8 | 1050 | 38 | 137 | 102 | 714 | E |
| 51 | AM | 53 | 8 | 1050 | 39 | 132 | 105 | 720 | E |
| 52 | AB | 43 | 9 | 950 | 49 | 119 | 87 | 801 | G |
| 53 | AC | 50 | 8 | 1000 | 46 | 143 | 109 | 765 | E |
| 54 | AD | 50 | 12 | 1000 | 45 | 122 | 92 | 784 | G |
| 55 | AE | 49 | 7 | 1050 | 44 | 109 | 83 | 825 | G |
| 56 | AF | 58 | 7 | 1050 | 39 | 133 | 100 | 774 | E |
| 57 | AG | 60 | 7 | 1050 | 40 | 140 | 114 | 749 | E |
| 58 | AN | 49 | 10 | 1050 | 46 | 101 | 95 | 813 | G |
| 59 | AL | 60 | 7 | 1150 | 66 | 124 | 90 | 831 | NA |
| 60 | AK | 54 | 8 | 1100 | 61 | 89 | 92 | 830 | NA |
| 61 | AG | 44 | 12 | 1250 | 68 | 84 | 83 | 798 | NA |
| 62 | AC | 28 | 20 | 1000 | 51 | 60 | 47 | 741 | NA |
| 63 | AF | 44 | 20 | 950 | 52 | 81 | 42 | 764 | NA |

TABLE 5

| Test Number | Steel | Hot working Area reduction ratio R (%) | Working time (mins) | Solution treatment temperature (° C.) | Microstructure Ferrite volume ratio (%) | NT (intersections) | NC (intersections) | YS (MPa) | HISC resistance test |
|---|---|---|---|---|---|---|---|---|---|
| 64 | AO | 64 | 8 | 1000 | 41 | 158 | 119 | 581 | E |
| 65 | AP | 68 | 7 | 1050 | 38 | 161 | 103 | 562 | E |
| 66 | AQ | 44 | 8 | 1000 | 48 | 121 | 95 | 597 | G |
| 67 | AR | 50 | 12 | 1050 | 46 | 125 | 96 | 546 | G |
| 68 | AS | 61 | 7 | 1050 | 42 | 144 | 113 | 572 | E |
| 69 | AT | 65 | 8 | 1070 | 39 | 154 | 101 | 603 | E |
| 70 | AU | 58 | 8 | 1080 | 43 | 133 | 94 | 602 | G |
| 71 | AV | 51 | 9 | 1050 | 40 | 125 | 99 | 583 | G |
| 72 | AW | 49 | 7 | 950 | 50 | 137 | 92 | 614 | G |
| 73 | AX | 59 | 10 | 1080 | 41 | 106 | 87 | 579 | G |
| 74 | AX | 40 | 13 | 1300 | 63 | 76 | 65 | 639 | NA |
| 75 | AV | 54 | 25 | 1050 | 45 | 94 | 39 | 580 | NA |
| 76 | AU | 20 | 23 | 950 | 45 | 55 | 46 | 514 | NA |
| 77 | AY | 53 | 10 | 1150 | 56 | 81 | 77 | 612 | NA |
| 78 | AZ | 49 | 12 | 1200 | 60 | 90 | 79 | 635 | NA |
| 79 | AO | 64 | 8 | 1000 | 40 | 143 | 120 | 834 | E |
| 80 | BA | 63 | 9 | 1070 | 43 | 139 | 113 | 849 | E |
| 81 | AP | 68 | 7 | 1050 | 39 | 140 | 101 | 821 | E |
| 82 | AQ | 44 | 8 | 1000 | 49 | 119 | 97 | 913 | G |
| 83 | AR | 50 | 12 | 1050 | 45 | 123 | 88 | 877 | G |
| 84 | AS | 61 | 7 | 1050 | 41 | 146 | 106 | 862 | E |
| 85 | AT | 65 | 8 | 1070 | 40 | 137 | 104 | 846 | E |
| 86 | AU | 58 | 8 | 1080 | 46 | 115 | 92 | 828 | G |
| 87 | BB | 59 | 10 | 1080 | 43 | 108 | 85 | 881 | G |
| 88 | AQ | 40 | 13 | 1300 | 72 | 87 | 71 | 920 | NA |
| 89 | AY | 53 | 10 | 1150 | 58 | 82 | 74 | 862 | NA |
| 90 | AZ | 49 | 12 | 1200 | 61 | 89 | 80 | 917 | NA |
| 91 | AP | 54 | 25 | 1050 | 44 | 92 | 38 | 759 | NA |
| 92 | AO | 20 | 23 | 950 | 43 | 64 | 47 | 790 | NA |

The hollow shell of each Test Number on which the above-described hot working had been performed was subjected to a solution treatment for a solution treatment time of 15 minutes at a solution treatment temperature shown in Table 3 to Table 5 and in which cooling, was performed by water-cooling. Steel seamless pipes of Test Numbers 1 to 17, 35 to 49, and 64 to 78 were produced by the above process. Steel seamless pipes of Test Numbers 18 to 34, 50 to 63, and 79 to 92 were further subjected to cold working after the solution treatment. As the cold working of the steel seamless pipes of Test Numbers 18 to 34, 50 to 63, and 79 to 92, cold drawing in which the reduction rate was set to 3% was performed. The steel seamless pipes of Test Numbers 18 to 34, 50 to 63, and 79 to 92 were produced by the above process.

[Evaluation Tests]

The steel seamless pipe of each Test Number that was produced as described above was subjected to microstructure observation, a tensile test and a HISC resistance test which are described hereunder.

[Microstructure Observation]

The steel seamless pipe of each Test Number was subjected to microstructure observation to determine the volume ratio of ferrite, and the number of intersections NT in the T direction and the number of intersections NC in the C direction in an observation field of view of 250 µm×250 µm. Specifically, a test specimen for microstructure observation having an observation surface with a size of 5 mm in the C direction×5 mm in the T direction was taken from a center portion of the wall thickness of the steel seamless pipe of each Test Number. The observation surface of the test specimen of each Test Number was polished into a mirror surface. The mirror-polished observation surface was electrolytically etched in a 7% potassium hydroxide etching solution to reveal the microstructure. The observation surface on which the microstructure had been revealed was observed in 10 fields of view using an optical microscope. The area of each field of view was $6.25\times10^4$ µm² (250 µm×250 km), and the magnification was 400 times.

In each field of view of each Test Number, phases other than ferrite and austenite in the microstructure were negligibly small in amount. In other words, the steel seamless pipe of each Test Number had a microstructure consisting of ferrite and austenite. In each field of view of each Test Number, ferrite and austenite were each identified based on contrast. The area ratio of the identified ferrite was determined by image analysis. An arithmetic average value of the area ratios of ferrite in the 10 fields of view was taken as the ferrite volume ratio (%). The determined ferrite volume ratios (%) are shown in Table 3 to Table 5.

In each field of view of each Test Number, in addition, line segments T1 to T4 extending in the T direction were arranged at equal intervals in the C direction of each field of view to divide each field of view into five equal parts in the C direction. In each field of view of each Test Number, furthermore, line segments C1 to C4 extending in the C direction were arranged at equal intervals in the T direction of each field of view to divide each field of view into five equal parts in the T direction. The number of intersections between the line segments T1 to T4 and the ferrite interfaces was counted and defined as the number of intersections NT in the T direction. Similarly, the number of intersections between the line segments C1 to C4 and the ferrite interfaces was counted and defined as the number of intersections NC in the C direction.

An arithmetic average value of the number of intersections NT in the T direction in the 10 fields of view was defined as the number of intersections NT in the T direction in the steel seamless pipe of the relevant Test Number. Similarly, an arithmetic average value of the number of intersections NC in the C direction in the 10 fields of view was defined as the number of intersections NC in the C direction in the steel seamless pipe of the relevant Test Number. In Table 3 to Table 5, the number of intersections NT in the T direction of each Test Number is shown as "NT (intersections)", and the number of intersections NC in the C direction is shown as "NC (intersections)", respectively.

[Tensile Test]

A tensile test was carried out on the steel seamless pipe of each Test Number by the above-described method conforming to ASTM E8/E8M (2013) to determine the yield strength (MPa). In the present Examples, a round bar test specimen for the tensile test was taken from a center portion of the wall thickness of the steel seamless pipe of each Test Number. The round bar test specimen was taken so as to be a size with a parallel portion diameter of 6 mm, and a parallel portion length of 30 mm. Note that the axial direction of the round bar test specimen was parallel to the pipe axis direction (L direction) of the steel seamless pipe. The 0.2% offset proof stress obtained in the tensile test was defined as the yield strength (MPa). Table 3 to Table 5 show the yield strength of each Test Number as "YS (MPa)".

[HISC Resistance Test]

The steel seamless pipe of each Test Number was subjected to a HISC resistance test to evaluate the HISC resistance. Specifically, V-notch test specimens for the HISC resistance test were taken from a center portion of the wall thickness of the steel seamless pipe of each Test Number. In each V-notch test specimen, the cross section of a parallel portion was a rectangle with sides of 7.5 mm, and the length of the parallel portion was 25.4 mm. The longitudinal direction of the V-notch test specimen was parallel to the pipe axis direction (L direction) of the steel seamless pipe. In addition, in the parallel portion of the V-notch test specimen, at a center position in the longitudinal direction, a V-notch having an angle of 45° and a depth of 1.5 mm and whose direction was in the pipe radius direction (C direction) was formed at a location corresponding to the surface side of the steel seamless pipe.

The V-notch test specimens of each Test Number were subjected to precharging. Specifically, a 3.5 weight % sodium chloride aqueous solution was heated to 80° C. and adopted as a test solution for precharging. Each V-notch test specimen of each Test Number and a reference electrode (saturated calomel electrode) were immersed in the test solution for precharging. In addition, a potential of −1050 mV was applied to the V-notch test specimens of each Test Number, and each V-notch test specimen was held for 30 days under the conditions.

After being precharged, the V-notch test specimens of each Test Number were subjected to a HISC test. Specifically, a stress equivalent to 85% of the actual yield stress was applied in the longitudinal direction of a V-notch test specimen of each Test Number. In addition, a stress equivalent to 93% of the actual yield stress was applied in the longitudinal direction of another V-notch test specimen of each Test Number. A 3.5 weight % sodium chloride aqueous solution was held at 4° C., and adopted as the test solution for the HISC test. The respective V-notch test specimens of each Test Number to which the stress was applied and a reference electrode (saturated calomel electrode) were immersed in the test solution for the HISC test. A potential of −1050 mV was applied to the V-notch test specimens of each Test Number. and the V-notch test specimens were held for 30 days under the conditions.

After being held for 30 days, the respective V-notch test specimens of each Test Number were observed with the naked eye and using a projector with a magnification of 10×. As the result of the observation, if cracking was not confirmed in the test specimen to which the stress equivalent to 93% of the actual yield stress had been applied, it was determined that the steel seamless pipe of the relevant Test Number had even more excellent HISC resistance ("E" (Excellent) in Table 3 to Table 5). If cracking was confirmed in the test specimen to which the stress equivalent to 93% of the actual yield stress had been applied, but cracking was not confirmed in the test specimen to which the stress equivalent to 85% of the actual yield stress had been applied, it was determined that the steel seamless pipe of the relevant Test Number had excellent HISC resistance ("G" (Good) in Table 3 to Table 5). If cracking was confirmed in the test specimen to which the stress equivalent to 85% of the actual yield stress had been applied, it was determined that the steel seamless pipe of the relevant Test Number did not have excellent HISC resistance ("NA" (Not Acceptable) in Table 3 to Table 5).

[Evaluation Results]

The test results are shown in Table 3 to Table 5. Referring to Table 1 to Table 5, in the steel seamless pipe of each of Test Numbers 1 to 11, 18 to 28, 35 to 44, 50 to 58, 64 to 73, and 79 to 87, the chemical composition was appropriate. In addition, the production method was a preferable production method described in the present description. As a result, the volume ratio of ferrite was 30 to 55%. In addition, in an observation field of view region of 250 μm×250 μm, the number of intersections NT was 65 or more and the number of intersections NC was 50 or more. In addition, the yield strength was 415 MPa or more. As a result, the steel seamless pipes of these Test Numbers exhibited the excellent HISC resistance in the HISC resistance test.

In addition, in the steel seamless pipes of Test Numbers 18 to 28, 50 to 58, and 79 to 87, the yield strength was 700 MPa or more. In other words, the steel seamless pipes of these Test Numbers exhibited the excellent HISC resistance in the HISC resistance test while also having an even higher yield strength.

In addition, in the steel seamless pipes of Test Numbers 1, 2, 7 to 10, 20, 21, 25 to 28, 35, 37, 40, 41, 50, 51, 53, 56, 57, 64, 65, 68, 69, 79 to 81, 84 and 85, the number of intersections NC was 100 or more. As a result, the steel seamless pipes of these Test Numbers exhibited the even more excellent HISC resistance in the HISC resistance test.

Furthermore, in the steel seamless pipes of Test Numbers 20, 21, 25 to 28, 50, 51, 53, 56, 57, 79 to 81, 84 and 85, the yield strength was 700 MPa or more, and the number of intersections NC was 100 or more. As a result, the steel seamless pipes of these Test Numbers exhibited the even more excellent HISC resistance in the HISC resistance test while also having an even higher yield strength.

On the other hand, for the steel seamless pipes of Test Numbers 12, 30, 45, 61, 74 and 88, the solution treatment temperature was too high. As a result, the volume ratio of ferrite was more than 55%. Consequently, the steel seamless pipes of these Test Numbers did not exhibit the excellent HISC resistance in the HISC resistance test.

For the steel seamless pipes of Test Numbers 13 and 31, the area reduction ratio R in the hot working was too low. As a result, in the observation field of view region of 250 μm×250 μm, the number of intersections NT was less than 65. Consequently, the steel seamless pipes of these Test Numbers did not exhibit the excellent HISC resistance in the HISC resistance test.

For the steel seamless pipes of Test Numbers 14, 29, 46, 63, 75 and 91, the working time in the hot working was too long. As a result, in the observation field of view region of 250 μm×250 μm, the number of intersections NC was less than 50. Consequently, the steel seamless pipes of these Test Numbers did not exhibit the excellent HISC resistance in the HISC resistance test.

For the steel seamless pipes of Test Numbers 15, 32, 47, 62, 76 and 92, the area reduction ratio R was too low. In addition, the working time was too long. As a result, in the observation field of view region of 250 μm×250 μm, the number of intersections NT was less than 65, and the number of intersections NC was less than 50. Consequently, the steel seamless pipes of these Test Numbers did not exhibit the excellent HISC resistance in the HISC resistance test.

For the steel seamless pipes of Test Numbers 16, 33, 48, 60, 77 and 89, the Ni content was too low. As a result, the volume ratio of ferrite was more than 55%. Consequently, the steel seamless pipes of these Test Numbers did not exhibit the excellent HISC resistance in the HISC resistance test.

For the steel seamless pipes of Test Numbers 17, 34, 49, 59, 78 and 90, the Cr content was too high. As a result, the volume ratio of ferrite was more than 55%. Consequently, the steel seamless pipes of these Test Numbers did not exhibit the excellent HISC resistance in the HISC resistance test.

An embodiment of the present disclosure has been described above. However, the embodiment described above is merely an example for carrying out the present disclosure. Therefore, the present disclosure is not limited to the above-described embodiment, and can be implemented by appropriately modifying the above-described embodiment within a range not departing from the spirit thereof.

REFERENCE SIGNS LIST

10 Ferrite
20 Austenite
50 Observation field of view region

The invention claimed is:

1. A duplex stainless steel seamless pipe consisting of, in mass %:
C: 0.030% or less,
Si: 0.20 to 1.00%,
Mn: 0.10 to 7.00%,
P: 0.040% or less,
S: 0.0100% or less,
Al: 0.100% or less,
Ni: 4.00 to 9.00%,
Cr: 20.00 to 28.00%,
Mo: 0.50 to 5.00%,
Cu: 0.01 to 4.00%,
N: 0.050 to 0.500%,
V: 0.01 to 1.50%,
W: 0 to 4.000%,
Co: 0 to 2.00%,
Sb: 0 to 0.100%,
Sn: 0 to 0.100%,
Nb: 0 to 0.100%,
Ta: 0 to 0.100%,
Ti: 0 to 0.100%, Zr: 0 to 0.100%,
Hf: 0 to 0.100%,
B: 0 to 0.0200%,
rare earth metal: 0 to 0.200%, and
one or more elements selected from the group consisting of:
Ca: 0.0001 to 0.0200%, and
Mg: 0.0001 to 0.0200%,
with the balance being Fe and impurities,
wherein
a microstructure consists of 30 to 55% of ferrite in volume ratio and austenite;
a yield strength is 415 MPa or more; and
wherein a pipe axis direction of the duplex stainless steel seamless pipe is defined as an L direction, a pipe radius direction of the duplex stainless steel seamless pipe is defined as a T direction, and a perpendicular direction to the L direction and the T direction is defined as a C direction,
in a square observation field of view region which includes a center portion of a wall thickness of the duplex stainless steel seamless pipe, and whose side extending in the T direction is 250 μm long and whose side extending in the C direction is 250 μm long,
wherein four line segments extending in the T direction which are arranged at equal intervals in the C direction of the observation field of view region and which divide the observation field of view region into five equal parts in the C direction are defined as T1 to T4,
four line segments extending in the C direction which are arranged at equal intervals in the T direction of the observation field of view region and which divide the observation field of view region into five equal parts in the T direction are defined as C1 to C4, and
an interface between the ferrite and the austenite in the observation field of view region is defined as a ferrite interface,
a number of intersections NT which is a number of intersections between the line segments T1 to T4 and the ferrite interfaces is 65 or more, and
a number of intersections NC which is a number of intersections between the line segments C1 to C4 and the ferrite interfaces is 50 or more.

2. The duplex stainless steel seamless pipe according to claim 1, having one or more elements selected from the group consisting of, in mass %:
W: 0.001 to 4.000%,
Co: 0.01 to 2.00%,
Sb: 0.001 to 0.100%,
Sn: 0.001 to 0.100%,
Nb: 0.001 to 0.100%,
Ta: 0.001 to 0.100%,
Ti: 0.001 to 0.100%,
Zr: 0.001 to 0.100%,
Hf: 0.001 to 0.100%,
B: 0.0005 to 0.0200%, and
rare earth metal: 0.001 to 0.200%.

* * * * *